US010581763B2

(12) United States Patent
Chin et al.

(10) Patent No.: US 10,581,763 B2
(45) Date of Patent: Mar. 3, 2020

(54) HIGH AVAILABILITY APPLICATION MESSAGING LAYER

(71) Applicant: AVAGO TECHNOLOGIES INTERNATIONAL SALES PTE. LIMITED, Singapore (SG)

(72) Inventors: Bill Ying Chin, San Jose, CA (US); Poongovan Ponnavaikko, Santa Clara, CA (US); Dan N. Retter, Cupertino, CA (US); Mayur Mahajan, San Francisco, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 1565 days.

(21) Appl. No.: 13/840,540

(22) Filed: Mar. 15, 2013

(65) Prior Publication Data

US 2014/0089425 A1 Mar. 27, 2014

Related U.S. Application Data

(60) Provisional application No. 61/704,281, filed on Sep. 21, 2012.

(51) Int. Cl.
  *H04L 12/58* (2006.01)
(52) U.S. Cl.
  CPC ............. *H04L 51/00* (2013.01); *H04L 51/30* (2013.01)
(58) Field of Classification Search
  CPC ...................................................... H04L 51/00
  (Continued)

(56) References Cited

U.S. PATENT DOCUMENTS

| 5,159,592 A | 10/1992 | Perkins |
| 5,278,986 A | 1/1994 | Jourdenais et al. |

(Continued)

FOREIGN PATENT DOCUMENTS

| CN | 101120317 A | 2/2008 |
| EP | 0887731 A1 | 12/1998 |

(Continued)

OTHER PUBLICATIONS

Final Office Action for U.S. Appl. No. 13/796,136, dated Jun. 17, 2016, 18 pages.

(Continued)

*Primary Examiner* — Moustafa M Meky
*Assistant Examiner* — Sm Z Islam
(74) *Attorney, Agent, or Firm* — Xsensus, LLP

(57) ABSTRACT

Certain embodiments enable application message delivery to be automatically guaranteed for all failover scenarios through use of a novel infrastructure layer that supports high availability (HA) messaging. The High Availability Application Messaging Layer (HAML) can guarantee delivery of application messages whether a failover occurs at one or both of the source and the intended destination of the message. The HAML may transmit messages to one intended destination, as unicast messaging, or to multiple intended destinations, as multicast messaging. In some embodiments, the HAML may be HA aware, which refers to the awareness of the HAML of the redundancy for all processing entities within a network device to ensure hitless failover at the network device. By moving support for HA messaging from individual applications to the HAML, as a common infrastructure layer across the processing entities, the individual applications do not need to implement additional software to explicitly support HA messaging.

20 Claims, 9 Drawing Sheets

(58) Field of Classification Search
USPC .................................................... 709/206
See application file for complete search history.

(56) References Cited

U.S. PATENT DOCUMENTS

| | | |
|---|---|---|
| 5,410,710 A | 4/1995 | Sarangdhar et al. |
| 5,473,599 A | 12/1995 | Li et al. |
| 5,550,816 A | 8/1996 | Hardwick et al. |
| 5,550,973 A | 8/1996 | Forman et al. |
| 5,553,230 A | 9/1996 | Petersen et al. |
| 5,649,110 A | 7/1997 | Ben-Nun et al. |
| 5,701,502 A | 12/1997 | Baker et al. |
| 5,732,209 A | 3/1998 | Vigil et al. |
| 5,828,578 A | 10/1998 | Blomgren |
| 5,878,232 A | 3/1999 | Marimuthu |
| 5,878,264 A | 3/1999 | Ebrahim |
| 5,970,232 A | 10/1999 | Passint et al. |
| 5,978,578 A | 11/1999 | Azarya et al. |
| 6,047,330 A | 4/2000 | Stracke, Jr. |
| 6,097,718 A | 8/2000 | Bion |
| 6,101,188 A | 8/2000 | Sekine et al. |
| 6,104,700 A | 8/2000 | Haddock et al. |
| 6,111,888 A | 8/2000 | Green et al. |
| 6,115,393 A | 9/2000 | Engel et al. |
| 6,119,200 A | 9/2000 | George |
| 6,161,169 A | 12/2000 | Cheng |
| 6,233,236 B1 | 5/2001 | Nelson et al. |
| 6,269,391 B1 | 7/2001 | Gillespie |
| 6,282,678 B1 | 8/2001 | Snay et al. |
| 6,331,983 B1 | 12/2001 | Haggerty et al. |
| 6,374,292 B1 | 4/2002 | Srivastava et al. |
| 6,397,242 B1 | 5/2002 | Devine et al. |
| 6,424,629 B1 | 7/2002 | Rubino et al. |
| 6,430,609 B1 | 8/2002 | Dewhurst et al. |
| 6,442,682 B1 | 8/2002 | Pothapragada et al. |
| 6,496,510 B1 | 12/2002 | Tsukakoshi et al. |
| 6,496,847 B1 | 12/2002 | Bugnion et al. |
| 6,526,054 B1 | 2/2003 | Li et al. |
| 6,567,417 B2 | 5/2003 | Kalkunte et al. |
| 6,570,875 B1 | 5/2003 | Hegde |
| 6,577,634 B1 | 6/2003 | Tsukakoshi et al. |
| 6,580,727 B1 | 6/2003 | Yim et al. |
| 6,587,469 B1 | 7/2003 | Bragg |
| 6,597,699 B1 | 7/2003 | Ayres |
| 6,604,146 B1 | 8/2003 | Rempe et al. |
| 6,608,819 B1 | 8/2003 | Mitchem et al. |
| 6,633,916 B2 | 10/2003 | Kauffman |
| 6,636,895 B1 | 10/2003 | Li et al. |
| 6,674,756 B1 | 1/2004 | Rao et al. |
| 6,675,218 B1 | 1/2004 | Mahler et al. |
| 6,678,248 B1 | 1/2004 | Haddock et al. |
| 6,680,904 B1 | 1/2004 | Kaplan et al. |
| 6,683,850 B1 | 1/2004 | Dunning et al. |
| 6,691,146 B1 | 2/2004 | Armstrong et al. |
| 6,704,925 B1 | 3/2004 | Bugnion |
| 6,711,357 B1 | 3/2004 | Brewer et al. |
| 6,711,672 B1 | 3/2004 | Agesen |
| 6,725,289 B1 | 4/2004 | Waldsprurger et al. |
| 6,731,601 B1 | 5/2004 | Krishna et al. |
| 6,732,220 B2 | 5/2004 | Babaian et al. |
| 6,763,023 B1 | 7/2004 | Gleeson et al. |
| 6,785,886 B1 | 8/2004 | Lim et al. |
| 6,789,156 B1 | 9/2004 | Waldsprurger |
| 6,791,980 B1 | 9/2004 | Li |
| 6,795,966 B1 | 9/2004 | Lim et al. |
| 6,847,638 B1 | 1/2005 | Wu |
| 6,854,054 B1 | 2/2005 | Kavanagh |
| 6,859,438 B2 | 2/2005 | Haddock et al. |
| 6,879,559 B1 | 4/2005 | Blackmon et al. |
| 6,880,022 B1 | 4/2005 | Waldsprurger et al. |
| 6,894,970 B1 | 5/2005 | McDermott, III et al. |
| 6,898,189 B1 | 5/2005 | Di Benedetto et al. |
| 6,910,148 B1 | 6/2005 | Ho et al. |
| 6,938,179 B2 | 8/2005 | Iyer et al. |
| 6,944,699 B1 | 9/2005 | Bugnion et al. |
| 6,961,806 B1 | 11/2005 | Agesen et al. |
| 6,961,941 B1 | 11/2005 | Nelson et al. |
| 6,975,587 B1 | 12/2005 | Adamski et al. |
| 6,975,639 B1 | 12/2005 | Hill et al. |
| 6,983,294 B2 | 1/2006 | Jones et al. |
| 7,039,720 B2 | 5/2006 | Alfieri et al. |
| 7,058,010 B2 | 6/2006 | Chidambaran et al. |
| 7,061,858 B1 | 6/2006 | Di Benedetto et al. |
| 7,065,059 B1 | 6/2006 | Zinin |
| 7,065,079 B1 | 6/2006 | Patra et al. |
| 7,080,283 B1 | 7/2006 | Songer et al. |
| 7,093,160 B2 | 8/2006 | Lau et al. |
| 7,133,399 B1 | 11/2006 | Brewer et al. |
| 7,188,237 B2 | 3/2007 | Zhou et al. |
| 7,194,652 B2 | 3/2007 | Zhou et al. |
| 7,236,453 B2 | 6/2007 | Visser et al. |
| 7,269,133 B2 | 9/2007 | Lu et al. |
| 7,284,236 B2 | 10/2007 | Zhou et al. |
| 7,292,535 B2 | 11/2007 | Folkes et al. |
| 7,305,492 B2 | 12/2007 | Bryers et al. |
| 7,308,503 B2 | 12/2007 | Giraud et al. |
| 7,315,552 B2 | 1/2008 | Kalkunte et al. |
| 7,317,722 B2 | 1/2008 | Aquino et al. |
| 7,324,500 B1 | 1/2008 | Blackmon et al. |
| 7,327,671 B2 | 2/2008 | Karino et al. |
| 7,339,903 B2 | 3/2008 | O'Neill |
| 7,360,084 B1 | 4/2008 | Hardjono |
| 7,362,700 B2 | 4/2008 | Frick et al. |
| 7,382,736 B2 | 6/2008 | Mitchem et al. |
| 7,385,977 B2 | 6/2008 | Wu et al. |
| 7,392,424 B2 | 6/2008 | Ho et al. |
| 7,404,006 B1 | 7/2008 | Slaughter et al. |
| 7,406,037 B2 | 7/2008 | Okita |
| 7,417,947 B1 | 8/2008 | Marques et al. |
| 7,417,990 B2 | 8/2008 | Ikeda et al. |
| 7,418,439 B2 | 8/2008 | Wong |
| 7,424,014 B2 | 9/2008 | Mattes et al. |
| 7,441,017 B2 | 10/2008 | Watson et al. |
| 7,444,422 B1 | 10/2008 | Li |
| 7,447,225 B2 | 11/2008 | Windisch et al. |
| 7,483,370 B1 | 1/2009 | Dayal et al. |
| 7,483,433 B2 | 1/2009 | Simmons et al. |
| 7,487,277 B2 | 2/2009 | Rinaldi et al. |
| 7,503,039 B2 | 3/2009 | Inoue et al. |
| 7,518,986 B1 | 4/2009 | Chadalavada et al. |
| 7,522,521 B2 | 4/2009 | Bettink et al. |
| 7,529,981 B2 | 5/2009 | Childress et al. |
| 7,533,254 B2 | 5/2009 | Dybsetter et al. |
| 7,535,826 B1 | 5/2009 | Cole et al. |
| 7,549,078 B2 * | 6/2009 | Harvey ............... G06F 11/2038 370/216 |
| 7,599,284 B1 | 10/2009 | Di Benedetto et al. |
| 7,609,617 B2 | 10/2009 | Appanna et al. |
| 7,613,183 B1 | 11/2009 | Brewer et al. |
| 7,620,953 B1 | 11/2009 | Tene et al. |
| 7,631,066 B1 | 12/2009 | Schatz et al. |
| 7,652,982 B1 | 1/2010 | Kovummal |
| 7,656,409 B2 | 2/2010 | Cool et al. |
| 7,664,020 B2 | 2/2010 | Luss |
| 7,694,298 B2 | 4/2010 | Goud et al. |
| 7,720,066 B2 | 5/2010 | Weyman et al. |
| 7,729,296 B1 | 6/2010 | Choudhary |
| 7,739,360 B2 | 6/2010 | Watson et al. |
| 7,751,311 B2 | 7/2010 | Ramaiah et al. |
| 7,787,360 B2 | 8/2010 | Windisch et al. |
| 7,787,365 B1 | 8/2010 | Marques et al. |
| 7,788,381 B2 | 8/2010 | Watson et al. |
| 7,802,073 B1 | 9/2010 | Cheng et al. |
| 7,804,769 B1 | 9/2010 | Tuplur et al. |
| 7,804,770 B2 | 9/2010 | Ng |
| 7,805,516 B2 | 9/2010 | Kettler et al. |
| 7,830,802 B2 | 11/2010 | Huang et al. |
| 7,830,895 B2 | 11/2010 | Endo et al. |
| 7,843,920 B2 | 11/2010 | Karino et al. |
| 7,843,930 B2 | 11/2010 | Mattes et al. |
| 7,873,776 B2 | 1/2011 | Hetherington et al. |
| 7,886,195 B2 | 2/2011 | Mayer |
| 7,894,334 B2 | 2/2011 | Wen et al. |
| 7,898,937 B2 | 3/2011 | O'Toole et al. |

(56) References Cited

U.S. PATENT DOCUMENTS

| | | |
|---|---|---|
| 7,929,424 B2 | 4/2011 | Kochhar et al. |
| 7,940,650 B1 | 5/2011 | Sandhir et al. |
| 7,944,811 B2 | 5/2011 | Windisch et al. |
| 7,974,315 B2 | 7/2011 | Yan et al. |
| 8,009,671 B2 | 8/2011 | Guo et al. |
| 8,014,394 B2 | 9/2011 | Ram |
| 8,028,290 B2 | 9/2011 | Rymarczyk et al. |
| 8,040,884 B2 | 10/2011 | Arunachalam et al. |
| 8,074,110 B2 | 12/2011 | Vera et al. |
| 8,086,906 B2 | 12/2011 | Ritz et al. |
| 8,089,964 B2 | 1/2012 | Lo et al. |
| 8,095,691 B2 | 1/2012 | Verdoorn, Jr. et al. |
| 8,099,625 B1 | 1/2012 | Tseng et al. |
| 8,102,848 B1 | 1/2012 | Rao |
| 8,121,025 B2 | 2/2012 | Duan et al. |
| 8,131,833 B2 | 3/2012 | Hadas et al. |
| 8,149,691 B1 | 4/2012 | Chadalavada et al. |
| 8,156,230 B2 | 4/2012 | Bakke et al. |
| 8,161,260 B2 | 4/2012 | Srinivasan |
| 8,180,923 B2 | 5/2012 | Smith et al. |
| 8,181,174 B2 | 5/2012 | Liu |
| 8,289,912 B2 | 10/2012 | Huang |
| 8,291,430 B2 | 10/2012 | Anand et al. |
| 8,335,219 B2 | 12/2012 | Simmons et al. |
| 8,341,625 B2 | 12/2012 | Ferris et al. |
| 8,345,536 B1 | 1/2013 | Rao et al. |
| 8,406,125 B2 | 3/2013 | Dholakia et al. |
| 8,495,418 B2 | 7/2013 | Abraham et al. |
| 8,503,289 B2 | 8/2013 | Dholakia et al. |
| 8,576,703 B2 | 11/2013 | Dholakia et al. |
| 8,599,754 B2 | 12/2013 | Li |
| 8,607,110 B1 | 12/2013 | Peng et al. |
| 8,769,155 B2 | 7/2014 | Nagappan et al. |
| 8,776,050 B2 | 7/2014 | Plouffe et al. |
| 8,856,590 B2 * | 10/2014 | Grieco .................. G06F 11/185 714/11 |
| 9,094,221 B2 | 7/2015 | Dholakia et al. |
| 9,137,671 B2 | 9/2015 | Fahldieck |
| 9,203,690 B2 | 12/2015 | Chin et al. |
| 2002/0002640 A1 | 1/2002 | Barry |
| 2002/0013802 A1 * | 1/2002 | Mori ..................... G06F 9/5016 718/1 |
| 2002/0035641 A1 | 3/2002 | Kurose et al. |
| 2002/0103921 A1 | 8/2002 | Nair et al. |
| 2002/0129166 A1 | 9/2002 | Baxter et al. |
| 2002/0150094 A1 | 10/2002 | Cheng et al. |
| 2003/0105794 A1 | 6/2003 | Jasinschi et al. |
| 2003/0202520 A1 | 10/2003 | Witkowski et al. |
| 2004/0001485 A1 | 1/2004 | Frick et al. |
| 2004/0030766 A1 | 2/2004 | Witkowski |
| 2004/0078625 A1 | 4/2004 | Rampuria et al. |
| 2005/0028028 A1 | 2/2005 | Jibbe |
| 2005/0036485 A1 | 2/2005 | Eilers et al. |
| 2005/0055598 A1 | 3/2005 | Chen et al. |
| 2005/0060356 A1 * | 3/2005 | Saika ................ G06F 11/1451 |
| 2005/0114846 A1 | 5/2005 | Banks et al. |
| 2005/0147028 A1 | 7/2005 | Na et al. |
| 2005/0149633 A1 | 7/2005 | Natarajan et al. |
| 2005/0213498 A1 | 9/2005 | Appanna et al. |
| 2006/0002343 A1 | 1/2006 | Nain et al. |
| 2006/0004942 A1 | 1/2006 | Hetherington et al. |
| 2006/0018253 A1 | 1/2006 | Windisch et al. |
| 2006/0018333 A1 | 1/2006 | Windisch et al. |
| 2006/0090136 A1 | 4/2006 | Miller et al. |
| 2006/0136913 A1 | 6/2006 | Sameske |
| 2006/0143617 A1 | 6/2006 | Knauerhase et al. |
| 2006/0171404 A1 | 8/2006 | Nalawade et al. |
| 2006/0176804 A1 | 8/2006 | Shibata |
| 2006/0184938 A1 | 8/2006 | Mangold |
| 2006/0190766 A1 | 8/2006 | Adler et al. |
| 2006/0212677 A1 | 9/2006 | Fossum |
| 2006/0224826 A1 | 10/2006 | Arai et al. |
| 2006/0274649 A1 | 12/2006 | Scholl |
| 2006/0294211 A1 | 12/2006 | Amato |
| 2007/0027976 A1 | 2/2007 | Sasame et al. |
| 2007/0036178 A1 | 2/2007 | Hares et al. |
| 2007/0076594 A1 | 4/2007 | Khan et al. |
| 2007/0083687 A1 | 4/2007 | Rinaldi et al. |
| 2007/0162565 A1 | 7/2007 | Hanselmann |
| 2007/0169084 A1 | 7/2007 | Frank et al. |
| 2007/0174309 A1 | 7/2007 | Pettovello |
| 2007/0189213 A1 | 8/2007 | Karino et al. |
| 2008/0022410 A1 | 1/2008 | Diehl |
| 2008/0068986 A1 | 3/2008 | Maranhao et al. |
| 2008/0082810 A1 | 4/2008 | Cepulis et al. |
| 2008/0089238 A1 | 4/2008 | Fahmy |
| 2008/0120518 A1 | 5/2008 | Ritz et al. |
| 2008/0137528 A1 | 6/2008 | O'Toole et al. |
| 2008/0159325 A1 | 7/2008 | Chen et al. |
| 2008/0165750 A1 | 7/2008 | Kim |
| 2008/0189468 A1 | 8/2008 | Schmidt et al. |
| 2008/0201603 A1 | 8/2008 | Ritz et al. |
| 2008/0212584 A1 | 9/2008 | Breslau et al. |
| 2008/0222633 A1 | 9/2008 | Kami |
| 2008/0225859 A1 | 9/2008 | Mitchem |
| 2008/0225874 A1 | 9/2008 | Lee |
| 2008/0243773 A1 | 10/2008 | Patel et al. |
| 2008/0244222 A1 | 10/2008 | Supalov et al. |
| 2008/0250266 A1 | 10/2008 | Desai et al. |
| 2008/0282112 A1 | 11/2008 | Bailey et al. |
| 2009/0028044 A1 | 1/2009 | Windisch et al. |
| 2009/0031166 A1 | 1/2009 | Kathail et al. |
| 2009/0036152 A1 | 2/2009 | Janneteau et al. |
| 2009/0037585 A1 | 2/2009 | Miloushev et al. |
| 2009/0040989 A1 | 2/2009 | da Costa et al. |
| 2009/0049537 A1 | 2/2009 | Chen et al. |
| 2009/0051492 A1 | 2/2009 | Diaz et al. |
| 2009/0052412 A1 | 2/2009 | Kumar et al. |
| 2009/0054045 A1 | 2/2009 | Zakrzewski et al. |
| 2009/0055831 A1 | 2/2009 | Bauman et al. |
| 2009/0059888 A1 | 3/2009 | Nelson et al. |
| 2009/0080428 A1 | 3/2009 | Witkowski et al. |
| 2009/0086622 A1 | 4/2009 | Ng |
| 2009/0086748 A1 | 4/2009 | Wang et al. |
| 2009/0092135 A1 | 4/2009 | Simmons et al. |
| 2009/0094481 A1 | 4/2009 | Vera et al. |
| 2009/0106409 A1 | 4/2009 | Murata |
| 2009/0185506 A1 | 7/2009 | Watson et al. |
| 2009/0186494 A1 | 7/2009 | Bell et al. |
| 2009/0193280 A1 | 7/2009 | Brooks et al. |
| 2009/0198766 A1 | 8/2009 | Chen et al. |
| 2009/0216863 A1 | 8/2009 | Gebhart et al. |
| 2009/0245248 A1 | 10/2009 | Arberg et al. |
| 2009/0219807 A1 | 11/2009 | Wang |
| 2009/0316573 A1 | 12/2009 | Lai |
| 2010/0017643 A1 | 1/2010 | Baba et al. |
| 2010/0039932 A1 | 2/2010 | Wen et al. |
| 2010/0042715 A1 | 2/2010 | Tham et al. |
| 2010/0058342 A1 | 3/2010 | Machida |
| 2010/0064293 A1 | 3/2010 | Kang et al. |
| 2010/0107162 A1 | 4/2010 | Edwards et al. |
| 2010/0138208 A1 | 6/2010 | Hattori et al. |
| 2010/0138830 A1 | 6/2010 | Astete et al. |
| 2010/0161787 A1 | 6/2010 | Jones |
| 2010/0169253 A1 | 7/2010 | Tan |
| 2010/0235662 A1 | 9/2010 | Nishtala |
| 2010/0257269 A1 | 10/2010 | Clark |
| 2010/0278091 A1 | 11/2010 | Sung et al. |
| 2010/0287548 A1 | 11/2010 | Zhou et al. |
| 2010/0325261 A1 | 12/2010 | Radhakrishnan et al. |
| 2010/0325381 A1 | 12/2010 | Heim |
| 2010/0325485 A1 | 12/2010 | Kamath et al. |
| 2011/0023028 A1 | 1/2011 | Nandagopal et al. |
| 2011/0029969 A1 | 2/2011 | Venkataraja et al. |
| 2011/0072327 A1 | 3/2011 | Schoppmeier et al. |
| 2011/0125894 A1 | 5/2011 | Anderson et al. |
| 2011/0125949 A1 | 5/2011 | Mudigonda et al. |
| 2011/0126196 A1 | 5/2011 | Cheung et al. |
| 2011/0154331 A1 | 6/2011 | Ciano et al. |
| 2011/0173334 A1 | 7/2011 | Shah |
| 2011/0228770 A1 | 9/2011 | Dholakia et al. |
| 2011/0228771 A1 | 9/2011 | Dholakia et al. |
| 2011/0228772 A1 | 9/2011 | Dholakia et al. |
| 2011/0228773 A1 | 9/2011 | Dholakia et al. |

(56) References Cited

U.S. PATENT DOCUMENTS

| | | | |
|---|---|---|---|
| 2011/0231578 A1 | 9/2011 | Nagappan et al. | |
| 2011/0238792 A1 | 9/2011 | Phillips et al. | |
| 2012/0023309 A1 | 1/2012 | Abraham et al. | |
| 2012/0023319 A1 | 1/2012 | Chin et al. | |
| 2012/0030237 A1* | 2/2012 | Tanaka | G06F 17/3028 707/770 |
| 2012/0158995 A1* | 6/2012 | McNamee | H04L 45/306 709/238 |
| 2012/0166764 A1 | 6/2012 | Henry et al. | |
| 2012/0170585 A1* | 7/2012 | Mehra | H04L 45/24 370/400 |
| 2012/0174097 A1 | 7/2012 | Levin | |
| 2012/0230240 A1 | 9/2012 | Nebat et al. | |
| 2012/0264437 A1* | 10/2012 | Mukherjee | H04L 65/1069 455/445 |
| 2012/0290869 A1* | 11/2012 | Heitz | H04L 69/16 714/4.11 |
| 2012/0297236 A1 | 11/2012 | Ziskind et al. | |
| 2013/0003708 A1 | 1/2013 | Ko et al. | |
| 2013/0013905 A1 | 1/2013 | Held et al. | |
| 2013/0067413 A1 | 3/2013 | Boss | |
| 2013/0070766 A1 | 3/2013 | Pudiyapura | |
| 2013/0191532 A1 | 7/2013 | Baum et al. | |
| 2013/0211552 A1 | 8/2013 | Gomez et al. | |
| 2013/0259039 A1 | 10/2013 | Dholakia et al. | |
| 2013/0263117 A1 | 10/2013 | Konik et al. | |
| 2013/0316694 A1 | 11/2013 | Yeh et al. | |
| 2014/0007097 A1 | 1/2014 | Chin et al. | |
| 2014/0029613 A1 | 1/2014 | Dholakia et al. | |
| 2014/0036915 A1 | 2/2014 | Dholakia et al. | |
| 2014/0068103 A1* | 3/2014 | Gyambavantha | H04L 47/2475 709/238 |
| 2014/0089484 A1 | 3/2014 | Chin et al. | |
| 2014/0095927 A1 | 4/2014 | Abraham et al. | |
| 2014/0143591 A1 | 5/2014 | Chiang et al. | |
| 2014/0219095 A1 | 8/2014 | Lim et al. | |
| 2015/0039932 A1 | 2/2015 | Kaufmann et al. | |
| 2016/0092324 A1 | 3/2016 | Young et al. | |
| 2016/0105390 A1 | 4/2016 | Bernstein et al. | |
| 2016/0182241 A1 | 6/2016 | Chin et al. | |

FOREIGN PATENT DOCUMENTS

| | | |
|---|---|---|
| EP | 0926859 A | 6/1999 |
| EP | 1107511 A2 | 6/2001 |
| EP | 1 939 742 A2 | 2/2008 |
| EP | 2 084 605 A2 | 8/2009 |
| WO | WO 2008/054997 A2 | 5/2008 |
| WO | WO 2014/004312 A1 | 1/2014 |

OTHER PUBLICATIONS

Non-Final Office Action for U.S. Appl. No. 14/514,253, dated Jul. 13, 2016, 28 pages.
U.S. Appl. No. 14/923,327, filed Oct. 26, 2015, by Bill Ying Chin (Unpublished.).
Final Office Action for U.S. Appl. No. 14/050,263 dated Oct. 7, 2015, 9 pages.
Notice of Allowance for U.S. Appl. No. 12/626,432, dated Oct. 27, 2015, 29 pages.
Notice of Allowance for U.S. Appl. No. 13/770,751, dated Nov. 16, 2015, 29 pages.
Notice of Allowance for U.S. Appl. No. 12/626,432, dated Nov. 20, 2015, 4 pages.
Non-Final Office Action for U.S. Appl. No. 13/796,136, dated Dec. 9, 2015, 16 pages.
U.S. Appl. No. 14/514,253 filed by Zhou et al. filed Oct. 14, 2014. (Unpublished.).
"GIGAswitch FDDI System—Manager's Guide," Part No. EK-GGMGA-MG.B01, Jun. 1993 first printing, Apr. 1995 second printing, Copyright 1995, 113 pages, Digital Equipment Corporation, Maynard, MA.
"GIGAswitch System—Manager's Guide," Part No. EK-GGMGA-MG.A01, Jun. 1993, Copyright 1993, 237 pages, Digital Equipment Corporation, Maynard, MA.
"Brocade ServerIron ADX 1000, 4000, and 8000 Series Frequently Asked Questions," 10 pages, Copyright 2009, Brocade Communications Systems, Inc.
Braden et al., "Integrated Services in the Internet Architecture: an Overview," Jul. 1994, RFC 1633, Network Working Group, pp. 1-28.
Burke, "Vmware Counters Oracle, Microsoft With Free Update", Nov. 13, 2007, 2 pages.
Chen, "New Paradigm in Application Delivery Networking: Advanced Core Operating System (ACOS) and Multi-CPU Architecture— They Key to Achieving Availability, Scalability and Preformance." White Paper, May 2009, 5 pages, A10 Networks.
Cisco IP Routing Handbook, Copyright 2000, 24 pages, M&T Books.
Cisco Systems, Inc., "BGP Support for Nonstop Routing (NSR) with Stateful Switchover (SSO)." Mar. 20, 2006, 18 pages.
Cisco Systems, Inc., "Graceful Restart, Non Stop Routing and IGP routing protocol timer Manipulation," Copyright 2008, 4 pages.
Cisco Systems, Inc., "Intermediate System-to-Intermediate System (IS-IS) Support for Graceful Restart (GR) and Non-Stop Routing (NSR)," Copyright 2008, pp. 1-3.
Cisco Systems, Inc., "Internet Protocol Multicast," Internetworking Technologies Handbook, 3rd Edition, Published 2000, Chapter 43, 16 pages.
Cisco Systems, Inc., "Multicast Quick—Start Configuration Guide," Document ID:9356, Copyright 2008-2009, 15 pages.
Cisco Systems, Inc., "Warm Reload," Cisco IOS Releases 12.3(2)T, 12.2(18)S, and 12.2(27)SBC, Copyright 2003, 14 pages.
Demers et al., "Analysis and Simulation of a Fair Queueing Algorithm," Xerox PARC, Copyright 1989, 12 pages, ACM.
European Search Report for Application No. EP 02254403, dated Mar. 18, 2003, 3 pages.
European Search Report for Application No. EP 02256444, dated Feb. 23, 2005, 3 pages.
*Extreme* v. *Enterasys* WI Legal Transcript of Stephen R. Haddock, May 7, 2008, vol. 2, 2 pages.
Fenner, et al., "Protocol Independent Multicast—Sparse Mode (PIM-SM): Protocol Specification (Revised)." Network Working Group, RFC 4601, Aug. 2006, pp. 1-151.
Floyd et al., "Link-sharing and Resource Management Models for Packet Networks," IEEE/ACM Transactions on Networking, Aug. 1995, vol. 3, No. 4, Copyright 1995, IEEE, 22 pages.
Freescale Semiconductor, Inc., "Freescale's Embedded Hypervisor for QorIQ™ P4 Series Communications Platform," White Paper, Oct. 2008, Copyright 2008, 8 pages, Document No. EMHYPQIQTP4CPWP, Rev. 1.
Freescale Semiconductor, Inc., "Embedded Multicore: An Introduction," Jul. 2009, Copyright 2009, 73 pages, Document No. EMBMCRM, Rev. 0.
Hardwick, "IP Multicast Explained," Metaswitch Networks, Jun. 2004, 71 pages.
Hemminger, "Delivering Advanced Application Acceleration & Security," Application Delivery Challenge, Jul. 2007, 3 pages.
Intel® Virtualization Technology, Product Brief, "Virtualization 2.0—Moving Beyond Consolidation", 2008, 4 pages.
IP Infusion Brochure, "ZebOS® Network Platform: Transporting You to Next Generation Networks," ip infusion™ An ACCESS Company, Jun. 2008, 6 pages.
Kaashok et al., "An Efficient Reliable Broadcast Protocol," Operating System Review, Oct. 4, 1989, 15 pages.
Kakadia, et al., "Enterprise Network Design Patterns: High Availability" Sun Microsystems, Inc., Sun BluePrints™ Online, Revision A, Nov. 26, 2003, 37 pages, at URL: http://www.sun.com/blueprints.
Kaplan, "Part 3 in the Reliability Series: NSR™ Non-Stop Routing Technology," White Paper, Avici Systems, Copyright 2002, 8 pages.
Keshav, "An Engineering Approach to Computer Networking: ATM Networks; the internet, and the Telephone Network," Addison-

(56) References Cited

OTHER PUBLICATIONS

Wesley Professional Computing Series, part 1 of 5, May 15, 1997, Copyright 1997, 148 pages, by AT&T, Addison-Wesley Publishing Company.
Keshav, "An Engineering Approach to Computer Networking: ATM Networks; the internet, and the Telephone Network," Addison-Wesley Professional Computing Series, part 2 of 5, May 15, 1997, Copyright 1997, 131 pages, by AT&T, Addison-Wesley Publishing Company.
Keshav, "An Engineering Approach to Computer Networking: ATM Networks; the internet, and the Telephone Network," Addison-Wesley Professional Computing Series, part 3 of 5, May 15, 1997, Copyright 1997, 129 pages, by AT&T, Addison-Wesley Publishing Company.
Keshav, "An Engineering Approach to Computer Networking: ATM Networks; the internet, and the Telephone Network," Addison-Wesley Professional Computing Series, part 4 of 5, May 15, 1997, Copyright 1997, 130 pages, by AT&T, Addison-Wesley Publishing Company.
Keshav, "An Engineering Approach to Computer Networking: ATM Networks; the internet, and the Telephone Network," Addison-Wesley Professional Computing Series, part 5 of 5, May 15, 1997, Copyright 1997, 142 pages, by AT&T, Addison-Wesley Publishing Company.
Khan, "IP Routing Use Cases," Cisco Press, Sep. 22, 2009, pp. 1-16, at URL: http://www.ciscopress.com/articles/printerfriendly.asp?p=1395746.
Lee, et al., "Open Shortest Path First (OSPF) Conformance and Performance Testing," White Papers, Ixia—Leader in Convergence IP Testing, Copyright 1998-2004, pp. 1-17.
Manolov, et al., "An Investigation into Multicasting, Proceedings of the 14th Annual Workshop on Architecture and System Design," (ProRISC2003), Veldhoven, The Netherlands, Nov. 2003, 6 pages.
May, et al., "An Experimental Implementation of Traffic Control for IP Networks," 1993, 11 pages, Sophia-Antipolis Cedex, France.
Moy, "OSPF Version 2," Network Working Group, RFC 2328, Apr. 1998, 204 pages.
Order Granting/Denying Request for Ex Parte Reexamination for U.S. Appl. No. 90/010,432, dated May 21, 2009, 18 pages.
Order Granting/Denying Request for Ex Parte Reexamination for U.S. Appl. No. 90/010,433, dated May 22, 2009, 15 pages.
Order Granting/Denying Request for Ex Parte Reexamination for U.S. Appl. No. 90/010,434, dated May 22, 2009, 20 pages.
Pangal, "Core Based Virtualization—Secure, Elastic and Deterministic Computing is Here . . . ," Blog Posting, May 26, 2009, 1 page, printed on Jul. 13, 2009, at URL: http://community.brocade.com/home/community/brocadeblogs/wingspan/blog/tags/serveri . . . .
Partridge, "A Proposed Flow Specification," RFC 1363, Sep. 1992, pp. 1-20, Network Working Group.
Pepelnjak, et al., "Using Multicast Domains," informIT, Jun. 27, 2003, pp. 1-29, at URL: http://www.informit.com/articles/printerfriendly.aspx?p=32100.
Product Category Brochure, "J Series, M Series and MX Series Routers—Juniper Networks Enterprise Routers—New Levels of Performance, Availability, Advanced Routing Features, and Operations Agility for Today's High-Performance Businesses," Juniper Networks, Nov. 2009, 11 pages.
Quickspecs, "HP Online VM Migration (for HP Integrity Virtual Machines)", Wordwide—Version 4, Sep. 27, 2010, 4 pages.
Riggsbee, "From ADC to Web Security, Serving the Online Community," Blog Posting, Jul. 8, 2009, 2 pages, printed on Dec. 22, 2009, at URL: http://community.brocade.com/home/community/brocadeblogs/wingspan/blog/2009/07/0 . . . .
Riggsbee, "You've Been Warned, the Revolution Will Not Be Televised," Blog Posting, Jul. 9, 2009, 2 pages, printed on Dec. 22, 2009, at URL: http://community.brocade.com/home/community/brocadeblogs/wingspan/blog/2009/07/0 . . . .
Rodbell, "Protocol Independent Multicast—Sparse Mode," CommsDesign, Dec. 19, 2009, pp. 1-5, at URL: http://www.commsdesign.com/main/9811/9811standards.htm.
Schlansker, et al., "High-Performance Ethernet-Based Communications for Future Multi-Core Processors," SC07 Nov. 10-16, 2007, Copyright 2007, 12 pages, ACM.
TCP/IP Illustrated, vol. 2: The Implementation, Gray R. Wright and W. Richard Stevens, Addison-Wesley 1995, 23 pages.
VMware, "Dynamic Balancing and Allocation of Resources for Virtual Machines", Product Datasheet, Copyright ® 1998-2006, 2 pages.
VMware, "Live Migration for Virtual Machines Without Service Interruption", Product Datasheet, Copyright ® 2009 Vmware, Inc., 4 pages.
VMware, "Resource Management with Vmware DRS", VMware Infrastructure, Copyright ® 1998-2006, 24 pages.
VMware., "Automating High Availability (HA) Services With VMware HA", VMware Infrastructure, Copyright ® 1998-2006, 15 pages.
Wolf, et al., "Design Issues for High-Performance Active Routers," IEEE Journal on Selected Areas in Communications, IEEE, Inc. New York, USA, Mar. 2001, vol. 19, No. 3, Copyright 2001, IEEE, 6 pages.
Notification of Transmittal of the International Search Report and the Written Opinion of the International Searching Authority, or the Declaration; International Search Report and Written Opinion of the International Searching Authority for International Application No. PCT/US2013/047105 dated Oct. 29, 2013, 8 pages.
Non-Final Office Action for U.S. Appl. No. 09/953,714, dated Dec. 21, 2004, 16 pages.
Final Office Action for U.S. Appl. No. 09/953,714, pages Jun. 28, 2005, 17 pages.
Non-Final Office Action for U.S. Appl. No. 09/896,228, dated Jul. 29, 2005, 17 pages.
Non-Final Office Action for U.S. Appl. No. 09/953,714, dated Jan. 26, 2006, 15 pages.
Final Office Action for U.S. Appl. No. 09/953,714, dated Aug. 17, 2006, 17 pages.
Non-Final Office Action for U.S. Appl. No. 09/896,228, dated Mar. 5, 2007, 14 pages.
Final Office Action for U.S. Appl. No. 09/896,228, dated Aug. 21, 2007, 15 pages.
Non-Final Office Action for U.S. Appl. No. 09/896,228, dated Sep. 7, 2006, 17 pages.
Notice of Allowance for U.S. Appl. No. 09/896,228, dated Jun. 17, 2008, 20 pages.
Non-Final Office Action for U.S. Appl. No. 12/210,957, dated Sep. 2, 2009, 16 pages.
Notice of Allowance for U.S. Appl. No. 09/953,714, dated Sep. 14, 2009, 6 pages.
Notice of Allowance for U.S. Appl. No. 12/210,957, dated Feb. 4, 2010, 10 pages.
Non-Final Office Action for U.S. Appl. No. 12/333,029, dated May 27, 2010, 29 pages.
Non-Final Office Action for U.S. Appl. No. 12/333,029, dated Mar. 30, 2012, 14 pages.
Non-Final Office Action for U.S. Appl. No. 12/626,432 dated Jul. 12, 2012, 13 pages.
Non-Final Office Action for U.S. Appl. No. 12/913,572 dated Aug. 3, 2012, 6 pages.
Non-Final Office Action for U.S. Appl. No. 12/823,073 dated Aug. 6, 2012, 21 pages.
Notice of Allowance for U.S. Appl. No. 12/333,029 dated Aug. 17, 2012, 5 pages.
Non-Final Office Action for U.S. Appl. No. 12/913,598 dated Sep. 6, 2012, 10 pages.
Non-Final Office Action for U.S. Appl. No. 12/913,612 dated Sep. 19, 2012, 11 pages.
Non-Final Office Action for U.S. Appl. No. 12/913,650 dated Oct. 2, 2012, 9 pages.
Notice of Allowance for U.S. Appl. No. 12/913,572 dated Nov. 21, 2012, 7 pages.
Non-Final Office Action for U.S. Appl. No. 12/842,936 dated Nov. 28, 2012, 12 pages.
Final Office Action for U.S. Appl. No. 12/823,073 dated Jan. 23, 2013, 23 pages.

(56) References Cited

OTHER PUBLICATIONS

Notice of Allowance for U.S. Appl. No. 12/913,598 dated Mar. 12, 2013, 5 pages.
Notice of Allowance for U.S. Appl. No. 12/913,650 dated Mar. 25, 2013, 6 pages.
Notice of Allowance for U.S. Appl. No. 12/842,936 dated Apr. 8, 2013, 6 pages.
Final Office Action for U.S. Appl. No. 12/626,432 dated Apr. 12, 2013, 14 pages.
Non-Final Office Action for U.S. Appl. No. 12/842,945 dated Jun. 20, 2013, 14 pages.
Notice of Allowance for U.S. Appl. No. 12/913,598 dated Jul. 9, 2013, 6 pages.
Advisory Action for U.S. Appl. No. 12/626,432 dated Sep. 25, 2013, 4 pages.
Non-Final Office Action for U.S. Appl. No. 12/626,432 dated Nov. 21, 2013, 9 pages.
Notice of Allowance for U.S. Appl. No. 12/823,073 dated Feb. 19, 2014, 8 pages.
Final Office Action for U.S. Appl. No. 12/842,945 dated Mar. 7, 2014, 13 pages.
Final Office Action for U.S. Appl. No. 12/626,432 dated Jul. 3, 2014, 12 pages.
Non-Final Office Action for U.S. Appl. No. 13/925,696 dated Aug. 27, 2014, 8 pages.
Non-Final Office Action for U.S. Appl. No. 13/796,136 dated Sep. 8, 2014, 19 pages.
Non-Final Office Action for U.S. Appl. No. 12/842,945 dated Sep. 17, 2014, 7 pages.
Notice of Allowance for U.S. Appl. No. 13/925,696 dated Jan. 7, 2015, 6 pages.
Non-Final Office Action for U.S. Appl. No. 12/626,432 dated Jan. 15, 2015, 13 pages.
Non-Final Office Action for U.S. Appl. No. 13/827,641 dated Feb. 18, 2015, 7 pages.
Non-Final Office Action for U.S. Appl. No. 13/770,751 dated Feb. 24, 2015, 10 pages.
Notice of Allowance for U.S. Appl. No. 13/925,723 dated Mar. 17, 2015, 5 pages.
Non-Final Office Action for U.S. Appl. No. 13/840,540 dated Mar. 23, 2015, 14 pages.
Final Office Action for U.S. Appl. No. 13/796,136 dated Mar. 27, 2015, 17 pages.
Non-Final Office Action for U.S. Appl. No. 13/621,138 dated Aug. 22, 2014, 6 pages.
Notice of Allowance for U.S. Appl. No. 13/621,138 dated May 11, 2015, 5 pages.
Non-Final Office Action for U.S. Appl. No. 14/050,263, dated Apr. 23, 2015, 5 pages.
Notice of Allowance for U.S. Appl. No. 12/842,945, dated Apr. 8, 2015, 9 pages.
Notice of Allowance for U.S. Appl. No. 13/621,138, dated Jul. 17, 2015, 5 pages.
Notice of Allowance and Fees dated Dec. 2, 2016 for U.S. Appl. No. 14/514,253, 9 pages.
Non-Final Office Action dated Jun. 29, 2017 for U.S. Appl. No. 14/923,327, 10 pages.
First Office Action dated Jul. 3, 2017 for Chinese Application No. 201380039803.1, 13 pages.
Examination Report dated Jul. 6, 2017 for European Application No. 13737020.1, 8 pages.
Final Office Action dated Jul. 28, 2017 for U.S. Appl. No. 13/796,136, 22 pages.
Final Office Action for U.S. Appl. No. 14/923,327, dated Nov. 2, 2017, 10 pages.
Notice of Allowance for U.S. Appl. No. 14/923,327, dated Jan. 5, 2018, 8 pages.
Non-Final Office Action for U.S. Appl. No. 13/796,136, dated Jan. 11, 2018, 21 pages.

\* cited by examiner

HIGH AVAILABILITY APPLICATION MESSAGING LAYER

CROSS-REFERENCES TO RELATED APPLICATIONS

The present application is a non-provisional of and claims the benefit and priority under 35 U.S.C. 119(e) of U.S. Provisional Application No. 61/704,281 filed Sep. 21, 2012, entitled HA APPLICATION MESSAGING LAYER, the entire contents of which are incorporated herein by reference for all purposes.

The present application is related to U.S. patent application Ser. No. 13/827,641, filed on Mar. 14, 2013, and entitled ROLE BASED MULTICAST MESSAGING INFRASTRUCTURE, naming Chin et al. (hereinafter "Chin"), the entirety of which is herein incorporated by reference for all purposes.

BACKGROUND

The present disclosure relates to networking and more particularly to techniques for communicating messages between processing entities on a network device.

A network device may have multiple processing entities within the device. In a distributed software model, each processing entity may execute one or more applications running on an operating system and network system. The network system may comprise a network stack, such as an OSI network stack of networking layer protocols. Different instantiations of an application may run on multiple processing entities within the network device, and application messages may be communicated between the instantiations using messaging schemes supported by the networking layer protocols.

The multiple processing entities may provide redundancy to the network device to avoid traffic disruption upon a failure event, wherein a failover should occur to switch processing to a redundant or standby processing entity. In some network devices, there is a need for high failover capability in order to provide high availability (HA) or continuous availability messaging to ensure hitless failover. Typically, applications that support HA messaging need to ensure redundancy for all permutations of failures at the processing entities of the network device. To avoid losing critical messages during a failover, an application needs to guarantee that messages can be delivered regardless of which end (i.e., the source or the destination) is failing over. This typically requires an application to include additional software to handle the various failover permutations. Thus, multiple applications running on a network device may each need to implement its own software to support HA messaging.

BRIEF SUMMARY

Certain embodiments of the present invention enable application message delivery to be automatically guaranteed for all failover scenarios through use of a novel infrastructure layer that supports HA messaging. The High Availability Application Messaging Layer (HAML) can guarantee delivery of application messages whether a failover occurs at one or both of the source and the intended destination of the message. The HAML may be used to transmit messages to one or more intended destinations. Accordingly, the HAML may be used for unicast messaging or for multicast messaging. In some embodiments, the HAML may be HA aware, which refers to the awareness of the HAML of the redundancy for all processing entities within a network device to ensure hitless failover at the network device. By moving support for HA messaging from individual applications to the HAML, as a common infrastructure layer across the processing entities, the individual applications do not need to implement additional software to explicitly support HA messaging.

In one embodiment, a network device comprises a first processing entity, a second processing entity, a third processing entity, and a fourth processing entity. The first processing entity is configurable to operate in a first role and to transmit a message for an intended destination, where the first processing entity is the source of the message. The second processing entity is configurable to operate in a second role, to receive the message, and to store the message at the second processing entity, where the second processing entity is a peer to the source of the message. The third processing entity is configurable to operate in the first role and to receive the message, where the third processing entity is the intended destination of the message. The fourth processing entity is configurable to operate in the second role, to receive the message, and to store the message at the fourth processing entity, where the fourth processing entity is a peer to the intended destination of the message.

In certain embodiments, the first role is an active role, wherein a processing entity operating in the first role is further configurable to perform a set of transport-related functions in the active role; and the second role is a standby role, wherein a processing entity operating in the second role is further configurable to not perform the set of transport-related functions in the standby role. In certain embodiments, the first processing entity is further configurable to receive an acknowledgement indicating that the message was received at the third processing entity and at the fourth processing entity, and in response to receiving the acknowledgement, to transmit a notification to the second processing entity to remove the message stored at the second processing entity; and the second processing entity is further configurable to receive the notification, and in response to receiving the notification, to remove the message stored at the second processing entity. The fourth processing entity may be further configurable to switch to operation in the first role from the second role when the third processing entity is no longer operating in the first role, to read the message, and to process the message.

In certain embodiments, the third processing entity is further configurable to read the message, to process the message, and after processing the message, to transmit a notification to the fourth processing entity to remove the message stored at the fourth processing entity; and the fourth processing entity is further configurable to receive the notification, and in response to receiving the notification, to remove the message stored at the fourth processing entity. In certain embodiments, the first processing entity is further configurable to block control, to receive an acknowledgement indicating that the message was received at the second processing entity, and in response to receiving the acknowledgement, to unblock control. The second processing entity may be further configurable to switch to operation in the first role from the second role when the first processing entity is no longer operating in the first role, and to transmit the message for the intended destination.

In certain embodiments, the first processing entity is further configured to receive an error notification indicating that the message was not received at the third processing entity. In certain embodiments, the message is for multiple intended destinations; and the first processing entity is further configurable to transmit the message to each intended destination of the multiple intended destinations, and to transmit the message to each peer to each intended destination of the multiple intended destinations.

In one embodiment, a method comprises transmitting a message for an intended destination from a first processing entity operating in a first role, where the first processing entity is the source of the message; receiving the message at a second processing entity operating in a second role, where the message is stored at the second processing entity, and the second processing entity is a peer to the source of the message; receiving the message at a third processing operating in the first role, where the third processing entity is the intended destination of the message; and receiving the message at a fourth processing entity operating in the second role, where the message is stored at the fourth processing entity, and the fourth processing entity is a peer to the intended destination of the message.

In one embodiment, a network device comprises a first processing entity and a second processing entity. The first processing entity is configurable to operate in a first role and to transmit a message for an intended destination. The second processing entity is configurable to operate in a second role and to receive the message. Upon occurrence of a failure event at the first processing entity, the second processing entity is configurable to switch to operating in the first role to determine that the second processing entity is a source of the message based on the second processing entity operating in the first role, and to transmit the message to the intended destination.

In one embodiment, a network device comprises a first processing entity and a second processing entity. The first processing entity is configurable to operate in a first role, where the first processing entity is an intended destination of a message. The second processing entity is configurable to operate in a second role and to receive the message. Upon occurrence of a failure event at the first processing entity, the second processing entity is configurable to switch to operating in the first role to determine that the second processing entity is the intended destination based on the second processing entity operating in the first role, and to process the message as the intended destination.

DETAILED DESCRIPTION

Figure 1:
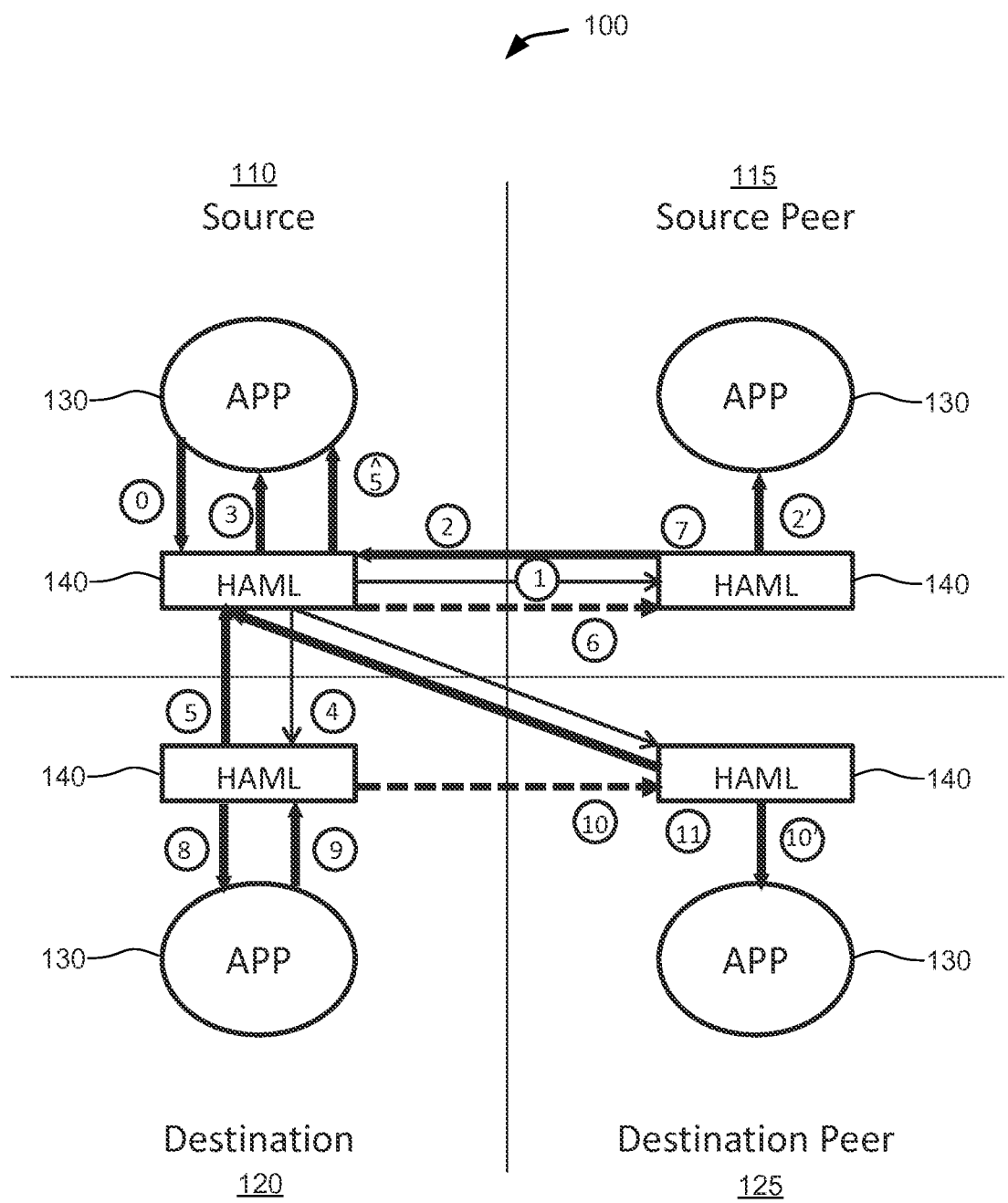
FIG. 1 is a simplified block diagram of a network device that may incorporate an embodiment of the present invention.

Attached as the Appendix are example application programming interfaces (APIs) for a High Availability Application Messaging Layer (HAML) that may be implemented in accordance with embodiments of the present invention.

It should be understood that the specific embodiments described in the Appendix are not limiting examples of the invention and that some aspects of the invention might use the teachings of the Appendix while others might not. It should also be understood that limiting statements in the Appendix may be limiting as to requirements of specific embodiments and such limiting statements might or might not pertain to the claimed inventions and, therefore, the claim language need not be limited by such limiting statements.

In the following description, for the purposes of explanation, specific details are set forth in order to provide a thorough understanding of certain embodiments of the invention. However, it will be apparent that various embodiments may be practiced without these specific details. The figures and description are not intended to be restrictive.

Certain embodiments of the present invention enable application message delivery to be automatically guaranteed for all failover scenarios through use of a novel infrastructure layer that supports HA messaging. The HAML can guarantee delivery of application messages whether a failover occurs at one or both of the source and the intended destination of the message. The HAML may be used to transmit messages to one or more intended destinations. Accordingly, the HAML may be used for unicast messaging or for multicast messaging. The HAML is fully reentrant and HA aware, which refers to the awareness of the HAML of the redundancy for all processing entities within a network device to ensure hitless failover at the network device. By moving support for HA messaging from individual applications to the HAML, as a common infrastructure layer across the processing entities, the individual applications no longer need to implement additional software to explicitly support HA messaging.

The HAML guarantees delivery of an application message in a source failover scenario by automatically transmitting the message to, and storing the message at, a peer for the source of the message. The HAML transmits the message to the source peer automatically without the application needing to explicitly transmit the message to the source peer directly. If a failure event then occurs at the source, the source peer can transmit the message to the destination, ensuring delivery. Further explanations are provided below for a source, a destination, and a peer.

Similarly, the HAML guarantees delivery of an application message in a destination failover scenario by automatically transmitting the message to, and storing the message at, a peer for each of one or more intended destinations (e.g., the one or more destinations designated or specified in the message). The HAML automatically multicasts (i.e., transmits at the same time) the message to each intended destination and each destination peer without the application needing to explicitly transmit the message to the destination peers directly. If a failure event then occurs at an intended destination, the respective destination peer can process the message in lieu of processing by the affected intended destination.

In certain embodiments, the HAML may be implemented as a library interface, which may be linked to by user space applications running on a network device. In certain embodiments, messages are delivered to each destination in the same order that the messages were sent. In some embodiments, application messages sent using the HAML may be idempotent (i.e., the messages produce the same result if processed one or more times), as duplicate messages may be received by an application in the event of a failover. However, it is expected that the application would discard the duplicate messages. In other embodiments, the HAML may ensure duplicate messages are not delivered to the application. In some embodiments, errors may be reported asynchronously, for example, if message synchronization between peers is lost, or a destination is no longer able to accept messages.

FIG. 1 is a simplified block diagram of a network device 100 that may incorporate an embodiment of the present invention. Network device 100 includes, with reference to an application message, a source 110, a source peer 115, a destination 120, and a destination peer 125. In some embodiments, multiple destinations 120 and destination peers 125 (not shown) are part of the network device 100 and may also receive the application message. The network device 100 depicted in FIG. 1 and the network devices depicted in FIGS. 3, 5, and 7 (to be described below) are merely examples and are not intended to unduly limit the scope of embodiments of the present invention as recited in the claims. One of ordinary skill in the art would recognize many variations, alternatives, and modifications. Network device 100 and the network devices depicted in FIGS. 3, 5, and 7 may be embodied in various different forms. For example, in one embodiment, network device 100 may be embodied as a switch or router or other network device such as those provided by Brocade Communications Systems, Inc. of San Jose, Calif.

In some embodiments, the source 110, the source peer 115, the destination 120, and the destination peer 125 are each a processing entity of a plurality of processing entities of network device 100. Processing entities may include, but are not limited to, physical processing units, logical processing units, or virtual processing entities. In one implementation, processing entities may include a group of one or more processing units, control circuits, and associated memory. For instance, a processing entity may be a management card or a line card of a network device. Alternatively, a processing entity may be one of multiple processing entities of a management card or a line card of a network device. In another implementation, a processing entity may include a processing unit, such as an AIM, Intel, AMD, ARM, TI, or Freescale Semiconductor, Inc. single-core or multicore processor, or an application-specific integrated circuit (ASIC) or a field programmable gate array (FPGA) running on a management card or a line card. In yet another implementation, the processing entity may include a logical processing unit within a physical processing unit. In yet another implementation, the processing entity may be a virtual processing entity or a software partitioning, such as a virtual machine, hypervisor, software process or an application running on a processing unit, such as a processor.

Each of the source 110, the source peer 115, the destination 120, and the destination peer 125 depicted in FIG. 1 includes running instantiations of an application 130 and the HAML 140. The source 110 of an application message is the processing entity upon which the instantiation of the application 130 transmitting the message is running. The message is intended (e.g., designated) to be transmitted to the instantiation of the application 130 running on the processing entity that is the destination 120. For full redundancy, each processing entity of the network device 100 needs to have a dedicated peer processing entity within the network device 100 that can take over processing in the event of a failover. A peer processing entity is configured or configurable to perform the same functions as the functions for which the processing entity to which it is peer is configured or configurable to perform. For example, the source 110 and the source peer 115 are both configured or configurable to perform the same functions. Likewise, the destination 120 and the destination peer 125 are both configured or configurable to perform the same functions. The peer relationship may be reciprocal. For example, the source 110 may also be the peer to the source peer 115, and the destination 120 may also be the peer to the destination peer 125. In other embodiments, there is less than full redundancy, wherein processing entities of the network device 100 share peer processing entities instead of each having a dedicated peer processing entity. In some embodiments, there is no redundancy, wherein there are no peer processing entities in the network device 100.

In certain embodiments, each processing entity of the network device 100 operates in one of multiple roles. An individual processing entity may be configured or configurable to operate in one or more of those multiple roles. In some embodiments, a processing entity may be configured or configurable to retain hardware awareness, which may refer to the awareness of the role in which the processing entity is currently operating. In some embodiments, hardware awareness is supported by the message transport used by the HAML, such as a Messaging Interface (MI) layer as described in Chin.

In one embodiment, the roles of the processing entities may include an active role and a standby role of the active-standby model used to enhance the availability of the network device. According to the active-standby model, a network device may comprise two processing entities where one of the processing entities is configured or configurable to operate in an "active" mode and the other is configured or configurable to operate in a "passive" (or standby) mode. The processing entity operating in the active mode (referred to as the active processing entity) is generally configured or configurable to perform a full set of networking functions, while the processing unit operating in passive or standby mode (referred to as the passive or standby processing entity) is configured or configurable to not perform the full set of networking functions or to perform only a small subset of the functions performed by the active processing entity. Upon an event that causes the active processing entity to reboot or fail (referred to as a switchover or failover event), which may occur, for example, due to an error in the active processing entity, the passive processing entity starts to operate in active mode and starts to perform functions that were previously performed by the previous active processing entity. The previous active processing entity may start to operate in standby mode. Processing entities that are operating in active mode may thus be operating in the active role and processing entities operating in the passive or standby mode may thus be operating in the passive or standby role.

FIG. 1 depicts the messaging between the processing entities of network device 100 when an application message is delivered from the source 110 to the destination 120. Although a failover at the source 110 or the destination 120 is not depicted in FIG. 1, the messaging illustrated and described below would ensure successful delivery even if a failover occurred. For ease of reference, instantiations of the application 130 and the HAML 140 running on a processing entity of network device 100 will be referred to below simply as the application 130 or the HAML 140, respectively, with the particular instantiation implied based on the context.

In some embodiments, the application 130 uses the HAML 140 by calling APIs implemented to perform the HAML functions. The Appendix provides example APIs for the HAML that may be implemented in accordance with an embodiment of the present invention. Example APIs are included for opening an HAML endpoint, sending messages to destination and destination peer endpoints, receiving messages, notifying the HAML of completed processing of a message, and closing of an HAML endpoint. Specific embodiments described in the Appendix are not limiting examples of the invention.

Figure 2:
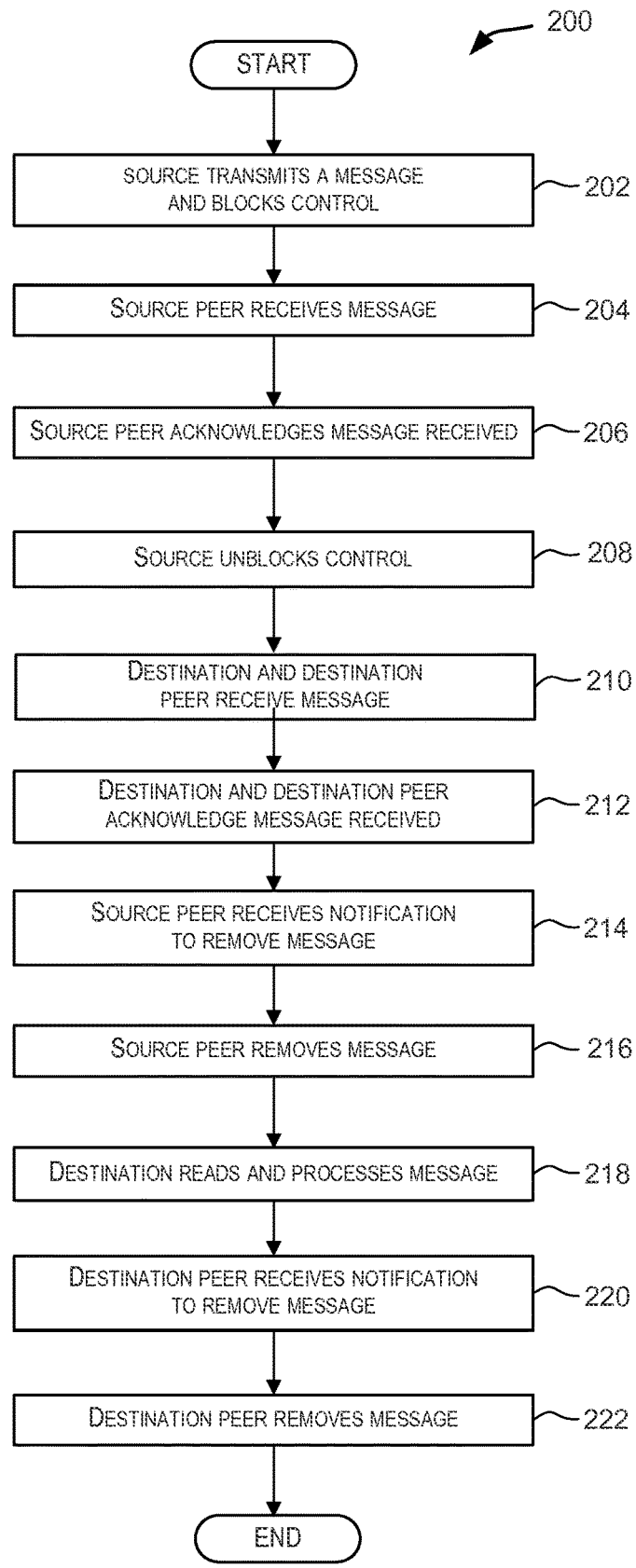
FIG. 2 depicts a simplified flowchart depicting transporting of a message between processing entities according to an embodiment of the present invention.
Figure 4:
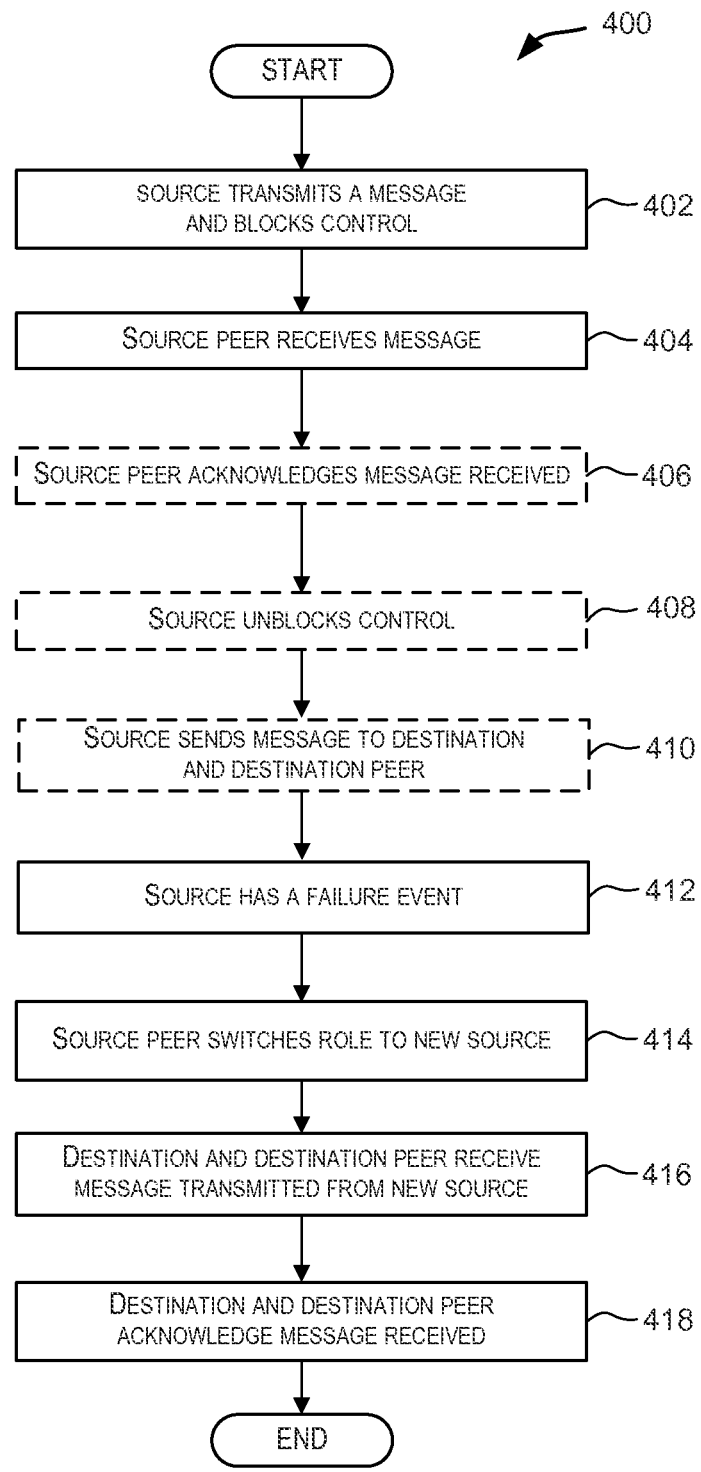
FIG. 4 depicts a simplified flowchart depicting transporting of a message between processing entities when a failure event occurs at the source of the message according to an embodiment of the present invention.
Figure 6:
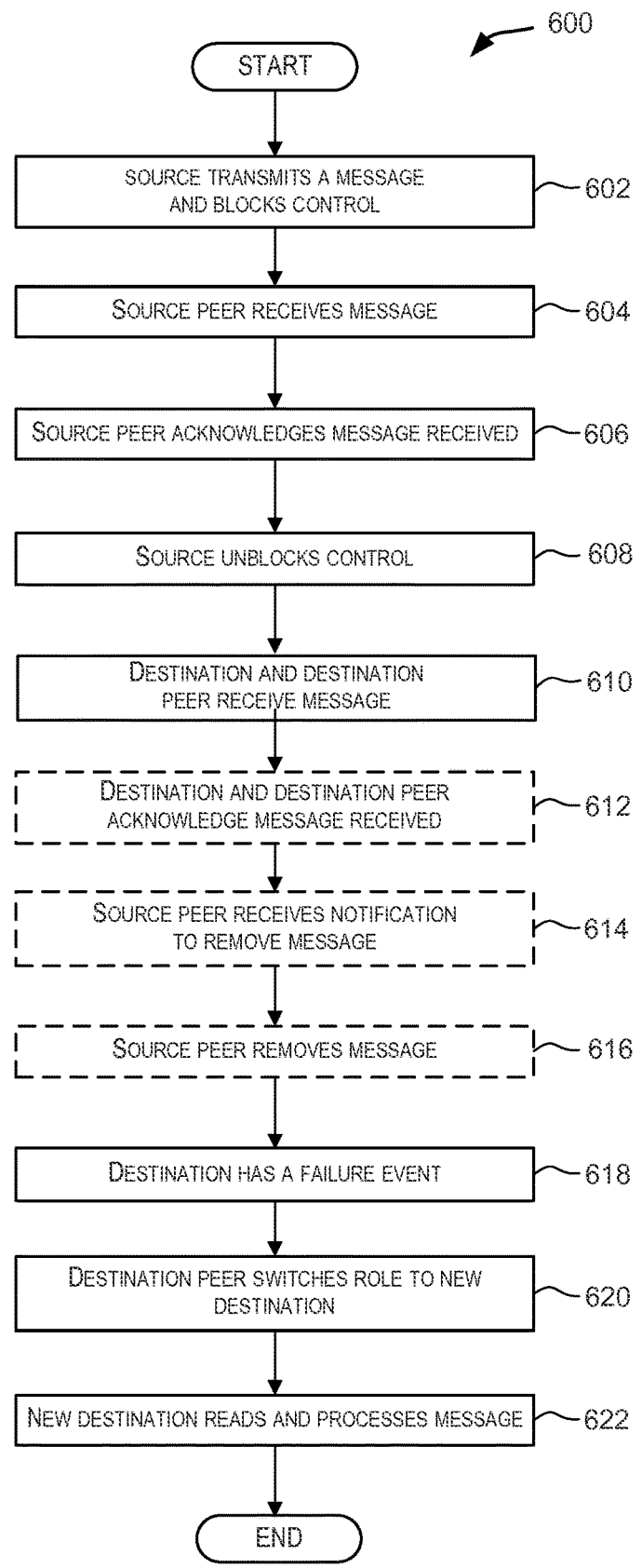
FIG. 6 depicts a simplified flowchart depicting transporting of a message between processing entities when a failure event occurs at the intended destination of the message according to an embodiment of the present invention.

FIG. 1 will be described with reference to the simplified flowchart 200 of FIG. 2, which depicts transporting of the message between the processing entities according to an embodiment of the present invention. In the exemplary embodiments depicted in FIGS. 1 and 2, the HAML 140 is used to transmit a message from one source 110 to one destination 120. However, this is not intended to be limiting. The HAML may be used to transmit a message to one or more destinations 120 (not shown) and to their one or more destination peers 125 (not shown). The processing depicted in FIG. 2 and in FIGS. 4 and 6 (to be described below) may be implemented in software (e.g., code, instructions, program) executed by one or more processing units (e.g., processors, cores), hardware, or combinations thereof. In certain embodiments, the software may be stored on a non-transitory computer-readable storage device or medium. The particular series of processing steps depicted in FIGS. 2, 4, and 6 is not intended to be limiting.

At 202, at the source 110, the application 130 generates a message and sends the message to the HAML 140, which transmits the message to the source peer 115 and blocks the application 130 running on the source 110. For example, the HAML 140 can transmit the message down the local OSI network stack of the source 110, through a bus interconnecting the processing entities of the network device 100, and up the OSI network stack of source peer 115. In some embodiments, the HAML 140 transmits the message down the local OSI network stack using an MI layer protocol as described in Chin. The application 130 may cause the HAML 140 to transmit the message, for example, by calling the haml_sendmsg( ) API of the Appendix. In some embodiments, the source 110 is operating in a first role of multiple roles. For example, the source 110 may be operating in an active role. In some embodiments, the message includes information indicative of a role or state or function performed by the destination 120.

At 204, at the source peer 115, the HAML 140 receives the message and stores the message. In some embodiments, the message is stored in a pending queue of the source peer 115. The message is stored at the source peer 115 to ensure that a copy of the message exists for transmission in the event that a failure event occurs at the source 110 before the source 110 can transmit the message to the destination 120. In some embodiments, the source peer 115 is operating in a second role of multiple roles. For example, the source peer 115 may be operating in a passive or standby role, wherein the source peer 115 can switch to an active role upon a failure event occurring at its peer, the source 110.

In some embodiments, messages pending in the HAML 140 running on the source 110 may be synchronized to the HAML 140 running on the source peer 115 when the source peer 115 first comes online, e.g., after a reboot. In some embodiments, the source peer 115 will not process any messages until this reconciliation with the source 110 is completed in order to avoid transmitting messages out of order. If messages pending in the HAML 140 running on the source 110 cannot be synchronized to the HAML 140 running on the source peer 115, sync may be declared lost. When this occurs, sync may be restored, for example, by rebooting the source peer 115.

At 206, the source peer 115 transmits an acknowledgment to the source 110 indicating that the message was received at the source peer 115. In some embodiments, the acknowledgement is sent by the HAML 140 running on the source peer 115. In other embodiments, the acknowledgment is sent by a different networking layer, e.g., an MI layer as described in Chin.

At 208, at the source 110, the HAML 140 receives the acknowledgment transmitted at 206, and in response, unblocks (i.e., returns control to) the application 130. In some embodiments, this is an asynchronous send of the message, in that control can be returned to the application 130 running on the source 110 without waiting for the destination 120 to acknowledge receiving the message. Alternatively, if the application 130 needs to know that the destination 120 received the message, the send may be synchronous, wherein the HAML 140 will not unblock (i.e., return control to) the application 130 until the HAML 140 receives an acknowledgement that the destination 120 received the message.

In some embodiments, the application 130 running on the source 110 can batch messages. All messages except for the final message of the batch can be sent as non-blocking Following transmission of each message except for the final message, control will be returned to the application 130 without waiting for any acknowledgements, including acknowledgment that the source peer 115 received the message. Only the final message of the batch needs to receive the acknowledgement transmitted at 206 indicating that the message was received at the source peer 115. Since messages are guaranteed to be delivered in order, acknowledgment received for the final message implies that all other messages of the batch have been received. This provides the benefit of reducing overall latencies at the source 110 and allowing the source 110 to synchronize at key points.

At 210, at the source 110, the HAML 140 multicasts (i.e., transmits at the same time) the message to both the destination 120 and the destination peer 125; and the destination 120 and the destination peer 125 receive the message. The destination peer 125 stores the message (e.g., in a pending queue of the destination peer 125) to ensure that a copy of the message exists for processing in the event that a failure event occurs at the destination 120 before the destination 120 can process the message. In some embodiments, the HAML 140 multicasts the message using an MI layer as described in Chin. In some embodiments, the HAML 140 transmits the message to the source peer 115, the destination 120, and the destination peer 125 simultaneously.

In some embodiments, the message includes information indicative of the role in which the intended (e.g., designated) destination of the message is operating. For example, the application 130 may specify that the message is to be transmitted to both the active destination (e.g., destination 120 operating in a first role, the active role) and the passive or standby destination (e.g., the peer destination 125 operating in a second role, the passive or standby role). Alternatively, the application 130 may specify that the message is only to be transmitted to the active destination (e.g., destination 120). In some embodiments, the application 130 running on the source 110 intends the message to be sent to multiple destinations, wherein at 210, the HAML 140 multicasts the message to the multiple intended (e.g., designated) destinations (e.g., multiple destinations 120 not shown in FIG. 1) and to the peers to the multiple intended destinations (e.g., multiple destination peers 125 not shown in FIG. 1).

At 212, the destination 120 and the destination peer 125 transmit acknowledgments to the source 110 indicating that the message was received at the destination 120 and the destination peer 125, respectively. In some embodiments, the acknowledgements are transmitted by the HAML 140 running on the destination 120 and the destination peer 125. In other embodiments, the acknowledgments are transmitted by a different networking layer, e.g., the MI layer described in Chin. In some embodiments, a single acknowledgment is transmitted to the source 110 to indicate that the message was received at both the destination 120 and the destination peer 125.

In some embodiments, messages that are not yet processed by the application 130 running on the destination 120 may be synchronized to the HAML 140 running on the destination peer 125 when the destination peer 125 first comes online, e.g., after a reboot. In some embodiments, the destination peer 125 will not process any messages until this reconciliation with the destination 120 is completed in order to avoid receiving messages out of order. If messages that are not yet processed by the application 130 running on the destination 120 cannot be synchronized to the HAML 140 running on the destination peer 125, sync may be declared lost. When this occurs, sync may be restored, for example, by rebooting the destination peer 125.

In some embodiments, if the destination 120 and the destination peer 125 do not receive the message multicast at 210 and/or do not transmit acknowledgments to the source 110 indicating that the message was received, the HAML 140 running on the source 110 may transmit an error notification to the application 130 indicating that an error occurred. The error notification may be transmitted when the message cannot be delivered to any of one or more destinations or any of the peers to the one or more destinations. An error may occur, for example, when the receive queue of a destination is full or the destination is experiencing congestion. A slow receiver can cause this error to occur. In some embodiments, the HAML 140 receives backpressure notification (e.g., from an MI layer described in Chin) if a destination is experiencing congestion. Failure events may also have occurred at both the destination 120 (e.g., the active processing entity) and the destination peer 125 (e.g., the standby processing entity). An error may also occur if an intended (e.g., designated) destination of the message does not exist. The error notification may include information identifying the destination at which the message was not received and information identifying the type of error. The error notification may be transmitted asynchronously to when the original message was transmitted.

At 214, at the source 110, the HAML 140 receives the acknowledgments transmitted at 212, and in response, transmits a notification to the source peer 115 to remove the message at the source peer 115; and at the source peer 115, the HAML 140 receives the notification to remove the message. Once the acknowledgments are received indicating that the message was safely delivered, the message no longer needs to be stored for possible retransmission by the source peer 115. With a synchronous send, the HAML 140 running on the source 110 unblocks the application 130 when it receives the acknowledgments transmitted at 212.

At 216, at the source peer 115, the HAML 140, in response to receiving the notification, removes the message stored at the source peer 115. The sending of the message is complete at this point, and the message will not be resent if a source failover occurs. In some embodiments, if the source peer 115 is also an intended destination of the message, the HAML 140 will send the message to the application 130 to be read and processed. In some embodiments, the application 130 running on the source peer 115 can receive, read, and process the message at any time after the message is received by the HAML 140 at 204.

At 218, at the destination 120, the HAML 140 sends the message to the application 130, where the message is read and processed. After the application 130 has completed processing the message, the application 130 notifies the HAML 140 that processing is complete. In some embodiments, any operations to synchronize the destination peer 125 with the destination 120 that may be triggered by the message need to be completed by the application 130 before the HAML 140 is notified that message processing is complete. The application 130 may notify the HAML 140 that processing is complete, for example, by calling the haml_msgdone( ) API of the Appendix.

At 220, in response to being notified that message processing is complete, the HAML 140 running on the destination 120 transmits a notification to the destination peer 125 to remove the message stored at the destination peer 125; and at the destination peer 125, the HAML 140 receives the notification to remove the message. Once processing of the message is completed at the destination 120, the message no longer needs to be stored for possible processing by the destination peer 125. In some embodiments, messages can be marked as not needing the application 130 running on the destination 120 to notify the HAML 140 that message processing is complete. For example, notification that the HAML 140 has completed message processing may not be needed in full destination HA messaging mode, which is described further below. In this mode, the destination 120 and the destination peer 125 are both intended destinations of the message, and each will process the message independently of the other.

At 222, at the destination peer 125, the HAML 140, in response to receiving the notification, removes the message stored at the destination peer 125. In some embodiments, if the destination peer 125 is also an intended destination of the message, the HAML 140 may send the message to the application 130 to be read and processed. In some embodiments, the application 130 running on the destination peer 125 can receive, read, and process the message once the HAML 140 running on the destination peer 125 receives the message, and does not need to wait for notification of completed message processing by the destination 120. This may occur, for example, when operating in full destination HA messaging mode, where the destination 120 and the destination peer 125 process the message independently of each other.

Although a failover at the source 110 or the destination 120 is not depicted in FIG. 1, the messaging illustrated and described above would ensure successful delivery even if a failover occurred. One challenge of transmitting messages in an HA messaging environment is ensuring that messages can be delivered when the source suffers a failure event. It is not possible to recover an application message from a source if an uncontrolled failover occurs before information about the message can be preserved. However, by using the HAML messaging described herein, the window in which messages can be lost can be greatly reduced relative to the window with messaging using typical networking protocols implemented by conventional network devices.

Figure 3:
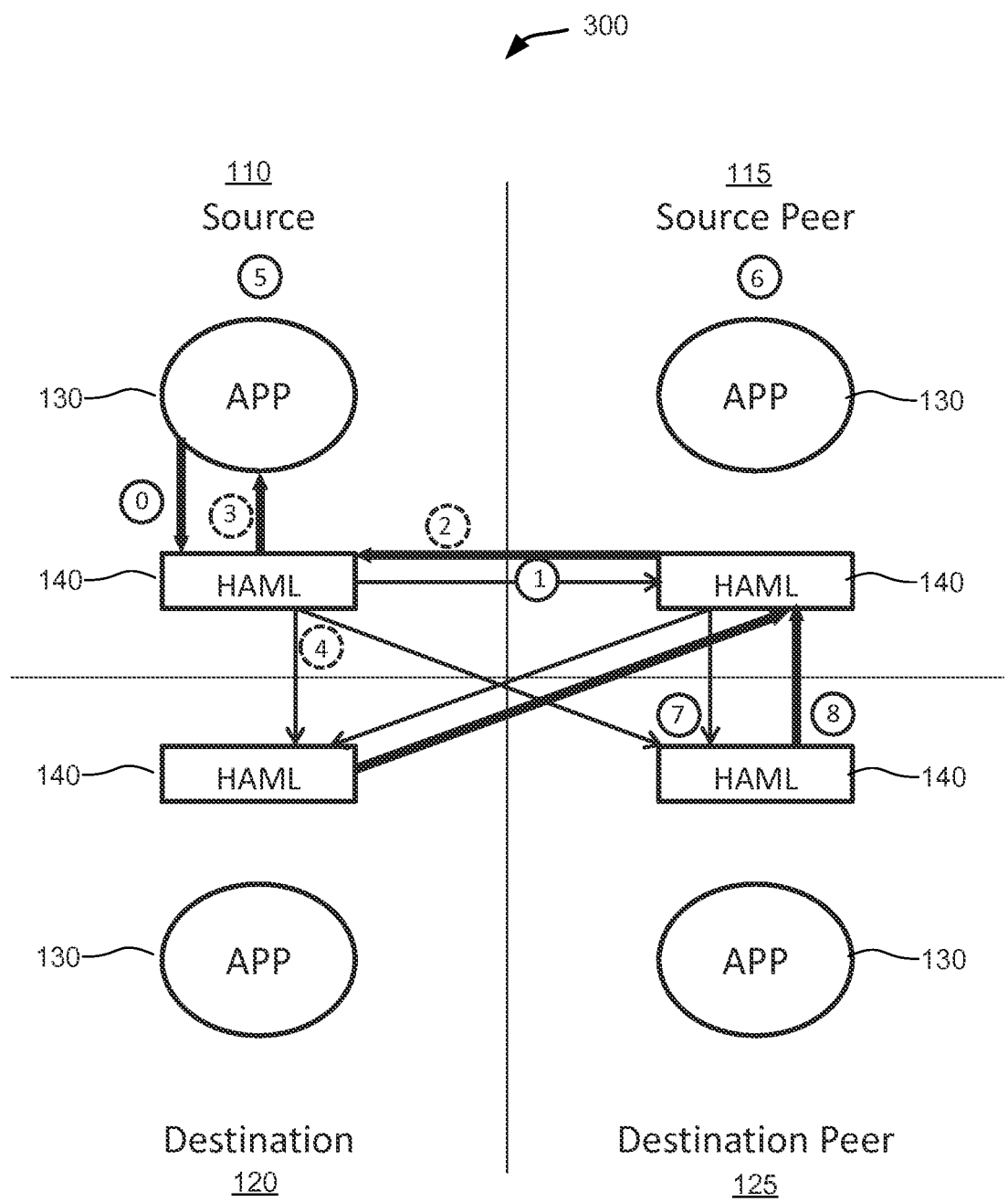
FIG. 3 is yet another simplified block diagram of a network device that may incorporate embodiments of the present invention.

An example is now provided in which a failure event occurs at the source 110. FIG. 3 depicts the messaging between the processing entities of network device 300 when an application message from the source 110 is delivered by the source peer 115 to the destination 120. As with the network device 100 of FIG. 1, the network device 300 of FIG. 3 includes, with reference to an application message, the source 110, the source peer 115, the destination 120, and the destination peer 125. Any of the one or more embodiments described above with respect to the network device 100 of FIG. 1 may also apply to the network device 300, although the embodiments described above are not intended to be limiting.

FIG. 3 will be described with reference to the simplified flowchart 400 of FIG. 4, which depicts transporting of a message between processing entities when a failure event occurs at the source of the message according to an embodiment of the present invention. FIG. 4 includes steps 202, 204, 206, 208, and 210 of the flowchart 200 of FIG. 2, renumbered as steps 402, 404, 406, 408, and 410, respectively.

At 402, at the source 110, the application 130 generates a message and sends the message to the HAML 140, which transmits the message to the source peer 115 and blocks the application 130.

At 404, at the source peer 115, the HAML 140 receives the message and stores the message. The message is stored at the source peer 115 to ensure that a copy of the message exists for transmission in the event that a failure event occurs at the source 110 before the source 110 can transmit the message to the destination 120. If a failure occurs at the source 110 before the message has been synced (i.e., received and stored by the source peer 115), the message is lost, and the application 130 should consider the message as not being transmitted. However, the application 130 should not assume that the destination 120 did not receive the message. If a source failover has not yet occurred, and the HAML 140 stores the message at the source peer 115 (e.g., in a pending queue), delivery of the message is guaranteed from this point onwards.

At 406, the source peer 115 transmits an acknowledgment to the source 110 indicating that the message was received at the source peer 115. A failure event at the source 110 may occur before the source peer 115 transmits this acknowledgment at 406. Thus, because this step may not occur before the source failover, the step is depicted in FIGS. 3 and 4 with a dashed line.

At 408, at the source 110, the HAML 140 receives the acknowledgment transmitted at 406, and in response, unblocks the application 130. Like 406, a failure event at the source 110 may occur before this step is performed. Thus, because this step may not occur before the source failover, the step is depicted in FIGS. 3 and 4 with a dashed line.

At 410, at the source 110, the HAML 140 multicasts (i.e., transmits at the same time) the message to both the destination 120 and the destination peer 125; and the destination 120 and the destination peer 125 receive the message. The destination peer 125 stores the message. Like 406 and 408, a failure event at the source 110 may occur before this step is performed, and thus, the step is depicted in FIGS. 3 and 4 with a dashed line.

At 412, the source 110 has a failure event. When this occurs, the source 110, which may have previously operated in a first role (e.g., an active role), may no longer operate in that first role. In some embodiments, the source 110 then switches to a second role (e.g., a passive or standby role).

At 414, the source peer 115 switches role to act as the new source for the message. For example, the source peer 115 may have previously operated in a second role (e.g., the passive or standby role), but upon the failure event occurring at the source 110, the source peer 115 switches to operate in the first role (e.g., the active role), as the new source.

At 416, at the source peer 115 now acting as the new source, the HAML 140 multicasts (i.e., transmits at the same time) the message to both the destination 120 and the destination peer 125; and the destination 120 and the destination peer 125 receive the message. In some embodiments, the application 130 is idempotent and can properly handle duplicate messages if they are received, for example, if the failover occurs after 410 but before step 212 of FIG. 2. In some embodiments, the HAML 140 may prevent duplicate messages from being delivered to the application 130.

At 418, the destination 120 and the destination peer 125 transmit acknowledgments to the source peer 115, as the new source, indicating that the message was received at the destination 120 and the destination peer 125, respectively. The destination peer 125 stores the message to ensure that a copy of the message exists for processing in the event that a failure event occurs at the destination 120 before the destination 120 can process the message.

From this point, the process flow can continue on from step 218 through step 222 of FIG. 2. Thus, as long as a source failover does not occur before the HAML 140 stores the message at the source peer 115 (e.g., in a pending queue), the message is guaranteed to be delivered.

Not only can the message source failover, the message destination can also failover. The HAML handles the destination failover problem by automatically multicasting messages to both the intended destination (e.g., the active destination) and the destination peer (e.g., the passive or standby destination). Thus, the HAML keeps the message queue of the destination peer synchronized with the message queue of the destination. When a destination failover occurs, the receive queue of the destination peer is fully synchronized, and the applications on the destination peer, now the new destination, can begin processing messages without needing to take any other actions, such as requesting retransmission of any messages. If the message is intended for multiple destinations, the message may be multicast to each of those intended destinations (e.g., the active destinations) and to each peer to those intended destinations (e.g., the passive or standby destinations).

Figure 5:
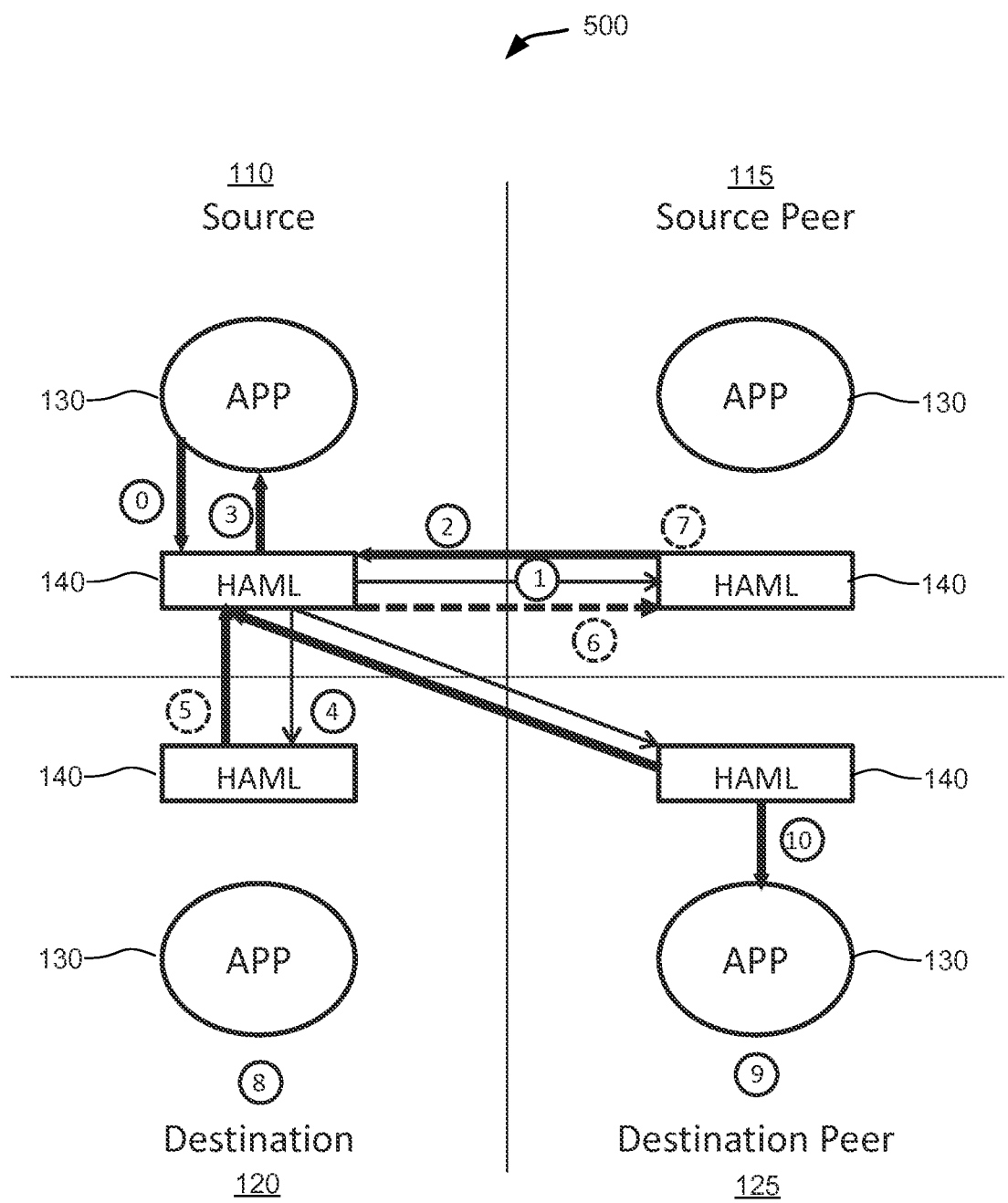
FIG. 5 is yet another simplified block diagram of a network device that may incorporate embodiments of the present invention.

An example is now provided in which a failure event occurs at the destination 120. FIG. 5 depicts the messaging between the processing entities of network device 500 when an application message from the source 110 is delivered to both the destination 120 and the destination peer 125, but the message is only processed by the destination peer 125. As with the network device 100 of FIG. 1, the network device 500 of FIG. 5 includes, with reference to an application message, the source 110, the source peer 115, the destination 120, and the destination peer 125. Any of the one or more embodiments described above with respect to the network device 100 of FIG. 1 may also apply to the network device 500, although the embodiments described above are not intended to be limiting.

FIG. 5 will be described with reference to the simplified flowchart 600 of FIG. 6, which depicts transporting of a message between processing entities when a failure event occurs at the intended destination of the message according to an embodiment of the present invention. FIG. 6 includes steps 202, 204, 206, 208, 210, 212, 214, and 216 of the flowchart 200 of FIG. 2, renumbered as steps 602, 604, 606, 608, 610, 612, 614, and 616, respectively.

At 602, at the source 110, the application 130 generates a message and sends the message to the HAML 140, which transmits the message to the source peer 115 and blocks the application 130. At 604, at the source peer 115, the HAML 140 receives and stores the message. At 606, the source peer 115 transmits an acknowledgment to the source 110 indicating that the message was received at the source peer 115. At 608, at the source 110, the HAML 140 receives the acknowledgment transmitted at 206, and in response, unblocks the application 130.

At 610, at the source 110, the HAML 140 multicasts (i.e., transmits at the same time) the message to both the destination 120 and the destination peer 125; and the destination 120 and the destination peer 125 receive the message. The destination peer 125 stores the message to ensure that a copy of the message exists for processing in the event that a failure event occurs at the destination 120 before the destination 120 can process the message. If a destination failover has not yet occurred, and the HAML 140 stores the message at the destination peer 125 (e.g., in a pending queue), processing of the message is guaranteed from this point onwards.

At 612, the destination 120 and the destination peer 125 transmit acknowledgments to the source 110 indicating that the message was received at the destination 120 and the destination peer 125, respectively. At 614, at the source 110, the HAML 140 receives the acknowledgments transmitted at 612, and in response, transmits a notification to the source peer 115 to remove the stored message; and at the source peer 115, the HAML 140 receives the notification to remove the message. At 616, at the source peer 115, the HAML 140, in response to receiving the notification, removes the stored message. In some scenarios, the destination failure event may occur before one or more of steps 612, 614, and 616. Thus, steps 612, 614, and 616 are depicted in FIGS. 5 and 6 with a dashed line.

At 618, the destination 120 has a failure event. When this occurs, the destination 120, which may have previously operated in a first role (e.g., an active role), may no longer operate in that first role. In some embodiments, the destination 120 then switches to a second role (e.g., a passive or standby role).

At 620, the destination peer 125 switches role to act as the new destination for the message. For example, the destination peer 125 may have previously operated in a second role (e.g., the passive or standby role), but upon the failure event occurring at the destination 120, the destination peer 125 switches to operate in the first role (e.g., the active role), as the new destination.

At 622, at the destination peer 125 now acting as the new destination, the HAML 140 sends the message to the application 130, where the message is read and processed. After the application 130 has completed processing the message, the application 130 may notify the HAML 140 that processing is complete.

In some embodiments, the application 130 is idempotent and can properly handle duplicate messages if they are received. For example, the synchronization message from the destination 120, now the old destination, may not have been received before the failover occurred. In some embodiments, the HAML 140 may prevent duplicate messages from being delivered to the application 130.

In some embodiments, the HAML may provide multiple message delivery modes to facilitate different messaging requirements of applications running on processing entities of a network device. Modes may be provided for different levels of HA messaging support in the sending of messages, and different levels of HA messaging support in the delivering of messages.

A first mode, which may be described as providing source HA messaging with passive destination HA messaging, is generally described in the embodiments above. In this mode, an application message is delivered to the source peer before the source is unblocked. The message is multicast to one or more destinations (e.g., active destinations) and the peers of the one or more destinations (e.g., passive or standby destinations). Only the one or more destinations process the message. That is, the one or more destination peers do not process the message unless a destination failover occurs. When the HAML is notified that the processing of the message is completed on a destination, the stored message will be removed from the respective destination peer. It is expected that a destination will perform any needed HA messaging synchronization with its destination peer.

A second mode may be described as providing source HA messaging with full destination HA messaging. In this mode, messages are processed at the one or more destinations and the peers of the one or more destinations. As with the first mode, an application message is delivered to the source peer before the source is unblocked, and the message is multicast to all the destinations and their peers. The destination and its destination peer will process the message independently of each other. In this mode, the HAML does not need to be notified that the processing of the message is completed, because the message is not stored at the destination peer.

A third mode may be described as providing source HA messaging without destination HA messaging. In this mode, a message is transmitted only to one or more destinations (e.g., active destinations) but not to any peers of those one or more destinations (e.g., passive or standby destinations). As with the first mode, an application message is delivered to the source peer before the source is unblocked. However, the message is received at one or more destinations, while the one or more destination peers will not receive the message. In this mode, the HAML does not need to be notified that the processing of the message is completed, because the message is not stored at any destination peers.

A fourth mode may be described as not providing source HA messaging while providing passive destination HA messaging. In this mode, an application message is not delivered to the source peer. The message is multicast to one or more destinations (e.g., active destinations) and the peers of the one or more destinations (e.g., passive or standby destinations). The source is unblocked after the message is transmitted to the destinations. Only the one or more destinations process the message; the one or more destination peers do not process the message unless a destination failover occurs. When the HAML is notified that the processing of the message is completed on a destination, the stored message will be removed from the respective destination peer. It is expected that a destination will perform any needed HA messaging synchronization with its destination peer.

A fifth mode may be described as not providing source HA messaging while providing full destination HA messaging. In this mode, an application message is not delivered to the source peer. The message is multicast to one or more destinations (e.g., active destinations) and the peer(s) of the one or more destinations (e.g., passive or standby destinations). The source is unblocked after the message is transmitted to the destinations. The destination and its destination peer will process the message independently of each other. In this mode, the HAML does not need to be notified that the processing of the message is completed, because the message is not stored at the destination peer.

A sixth mode may be described as disabling both source HA messaging and destination HA messaging. In this mode, an application message is not delivered to the source peer or to any destination peers (e.g., passive or standby destinations). Applications may use this mode to transmit non-critical messages to one or more destinations. The source is unblocked after the message is transmitted to the one or more destinations. Only the one or more destinations receive and process the message. In this mode, the HAML does not need to be notified that the processing of the message is completed, because the message is not stored at any destination peers.

Figure 7:
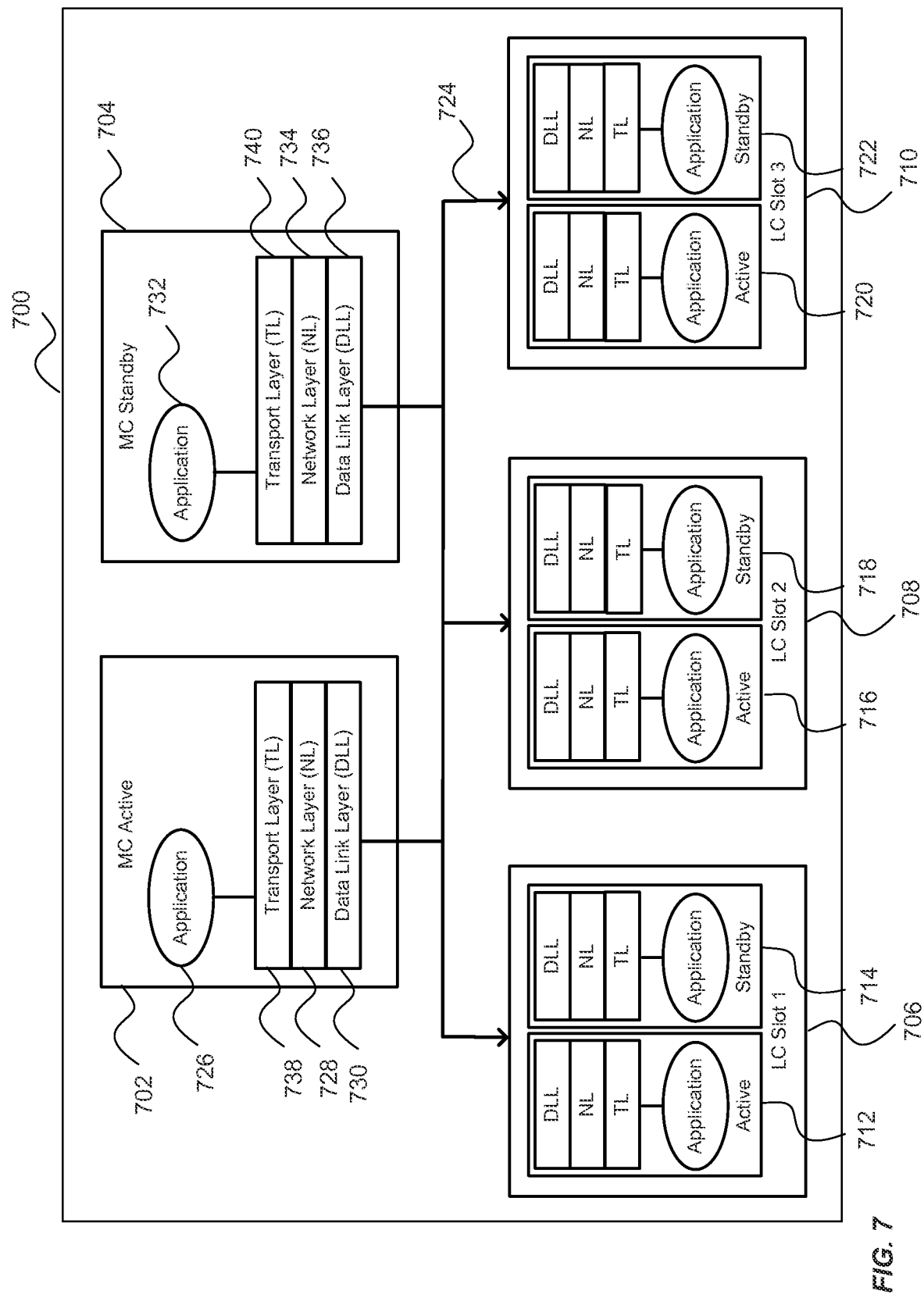
FIG. 7 is yet another simplified block diagram of a network device that may incorporate embodiments of the present invention.

FIG. 7 is another simplified block diagram of a network device 700 that may incorporate an embodiment of the present invention. Network device 700 may be a router or switch that is configured to forward data such as a router or switch provided by Brocade Communications Systems, Inc. In one implementation the network device 700 may be configured to perform HA application messaging. The HA application messaging services include services and functions related to facilitating transporting of application messages. In one embodiment, network device 700 provides guaranteed application message delivery within a network device even in the event of a failure at the source and/or at the intended destination of a message.

In the embodiment depicted in FIG. 7, network device 700 may comprise a plurality of ports (not shown) for receiving and forwarding data packets and multiple cards that are configured to perform processing to facilitate forwarding of the data packets. The multiple cards may include one or more line cards (706, 708, and 710) and one or more management cards (702 and 704). Each card may have one or more processing entities and various other computing resources, such as volatile and non-volatile memory. Although referred to as a management card or line card, the card may be a System of a Chip (SoC) or a circuit board. In one embodiment, a card, sometimes also referred to as a blade or module, can be inserted into one of a plurality of slots on the chassis of network device 700. This modular design allows for flexible configurations with different combinations of cards in the various slots of the device according to differing network topologies and switching requirements. The components of network device 700 depicted in FIG. 7 are meant for illustrative purposes only and are not intended to limit the scope of the invention in any manner. Alternative embodiments may have more or less components than those shown in FIG. 7.

The slots on the chassis of network device 700 may have identifiers. For example, the slots occupied by the line cards of network device 700 are identified as LC slot 1, LC slot 2, and LC slot 3. In one implementation, each card of the network device 700 is associated with a unique slot identifier. For example, line card 706 is associated with a unique slot identifier LC slot 1. Line card 706 may have multiple processing entities, such as a first processing entity 712 and a second processing entity 714 depicted in FIG. 7. In another implementation, multiple cards (e.g., multiple line cards) can be associated with the same slot identifier. For example, the identifier LC slot 1 could alternatively be associated with both of line cards 706 and 708, each of which may have one or more processing entities.

Network device 700 is configured or configurable to receive and forward data using ports. Upon receiving a data packet via an input port, network device 700 is configured or configurable to determine an output port to be used for transmitting the data packet from the network device 700 to facilitate communication of the packet to another network device or network. Within network device 700, the packet is forwarded from the input port to the determined output port and transmitted from network device 700 using the output port. In one embodiment, forwarding of packets from an input port to an output port is performed by one or more line cards. Line cards represent the data forwarding plane of network device 700. Each line card may comprise one or more processing entities that are each configured or configurable to perform forwarding of data packets. A processing entity on a line card may also be referred to as a line card processing entity. Each line card processing entity may have an associated packet processor (e.g., a processor or a core) and associated memories or portions of memories to facilitate the packet forwarding process. Since processing performed by a packet processor needs to be performed at a high packet rate in a deterministic manner, the packet processor is generally a dedicated hardware device configured to perform the processing. In one embodiment, the packet processor is a programmable logic device such as an FPGA. The packet processor may also be an ASIC.

The management cards 702 and 704 are configured or configurable to perform management and control functions for network device 700 and thus represent the management plane for network device 700. In one embodiment, management cards 702 and 704 are communicatively coupled to line cards via bus 724 and include software and hardware for controlling various operations performed by the line cards. In one embodiment, more than one management card (e.g., management cards 702 and 704) may be used, with each management card controlling one or more line cards. In alternative embodiments, a single management card may be used for all the line cards in a network device.

The management cards 702 and 704 may each comprise one or more processing entities that are each configured or configurable to perform functions performed by the management card and associated memory. Each processing entity of a management card may have an associated processor (also referred to as a management processor) and associated memories or portions of memories to perform management and control functions. In one embodiment, a management processor is a general purpose single-core or multicore microprocessor such as ones provided by AIM, Intel, AMD, ARM, TI, Freescale Semiconductor, Inc., and the like, that operates under the control of software stored in associated memory or portions of memory.

Figure 8:
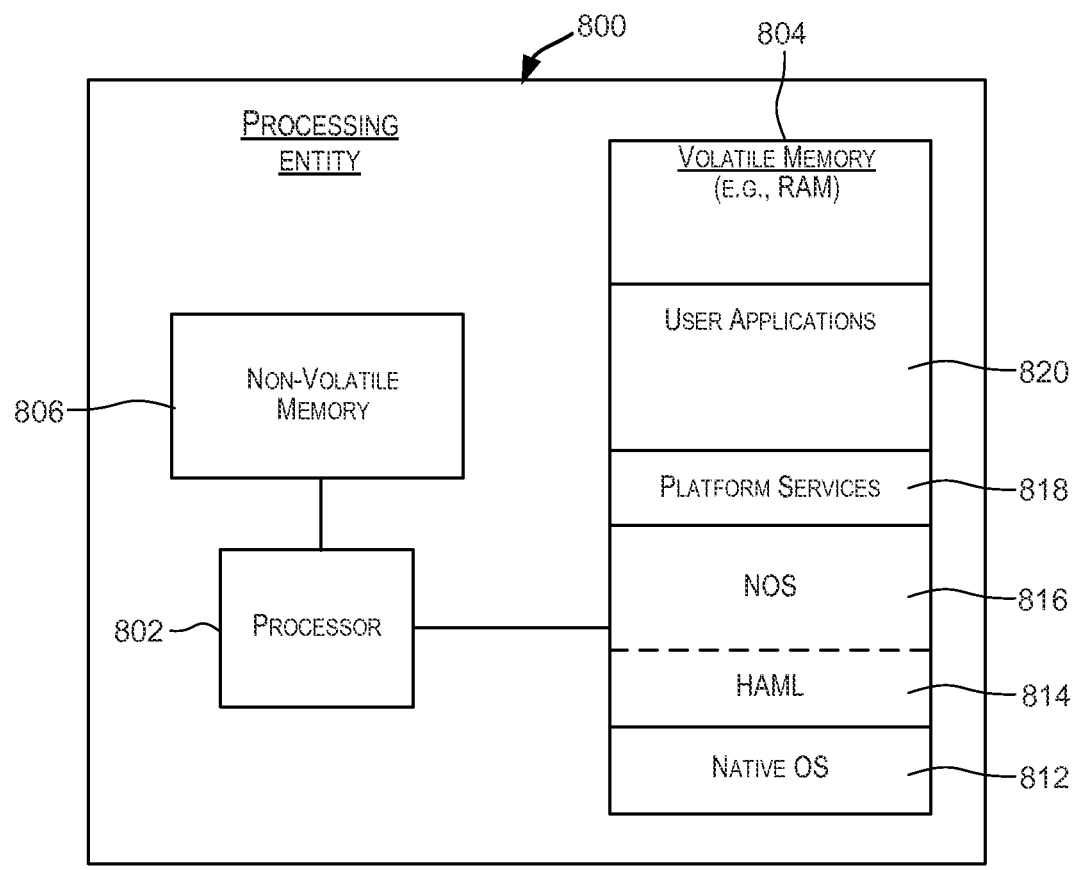
FIG. 8 is a simplified block diagram of a processing entity of a card in a network device that may incorporate embodiments of the present invention.

FIG. 8 is a simplified block diagram of a processing entity 800 of a card (e.g., a management card or a line card) of a network device that may incorporate an embodiment of the present invention. The components of processing entity 800 depicted in FIG. 8 are meant for illustrative purposes only and are not intended to limit the scope of the invention in any manner. Alternative embodiments may have more or fewer components than those shown in FIG. 8.

In the embodiment depicted in FIG. 8, a processing entity 800 comprises a processor 802 (e.g., a packet processor or a management processor) with associated volatile memory 804 and non-volatile memory 806 that are dedicated only to that processing entity 800. In other embodiments, the volatile memory 804 and/or the non-volatile memory 806 associated with the processing entity 800 are/is portion(s) of one or more memories that are each associated with multiple processing entities of the card. The processor 802 is configured or configurable to execute software that controls the operations of the processing entity 800. The software that is loaded into volatile memory 804 and executed by the processor 802 may be in the form of programs/code/instructions, data constructs, and APIs. The APIs may include one or more of the APIs described above or the APIs provided in the Appendix. Volatile memory 804 is typically a random access memory (RAM) and sometimes referred to as system memory. Non-volatile memory 806 may be of different types including a compact flash, a hard disk, an optical disk, and the like. Non-volatile memory 806 may also store programs/code/instructions that are to be loaded in volatile memory 804 and executed by the processor 802 and also any related data constructs and APIs.

The volatile memory 804 of FIG. 8 includes native operating system (OS) 812, the HAML 814, network operating system (NOS) 816, platform services 818, and user applications 820. Native OS 812 is generally a commercially available operating system such as Linux, Unix, Windows OS, or other operating system. NOS 816 provides the foundation and support for networking services provided by the network device. In one embodiment, the HAML 814 may be provided as a component of NOS 816. Platform services component 818 may comprise logic for blade-level management (in a chassis-based network device with multiple blades), chassis environment setup, power supply management, messaging services, daemons support, support for command line interfaces (CLIs), etc. User applications 820 and potentially other applications may also be stored in volatile memory 804.

One or more of the management cards 702 and 704 and/or line cards 706, 708, and 710 of network device 700 of FIG. 7 may be implemented with one or more processing entities as depicted in the processing entity 800 of FIG. 8. The embodiment depicted in FIG. 7 depicts a chassis-based system. This however is not intended to be limiting. Certain embodiments of the present invention may also be embodied in non-chassis based network devices, which are sometimes referred to as "pizza boxes." Such a network device may comprise a single physical multicore CPU or multiple physical multicore CPUs.

Embodiments of the invention enable reliable communication between the various processing entities within the network device 700 using the HAML protocol. In one exemplary configuration of network device 700, the network device 700 has an active management card 702 and a passive or standby management card 704. As shown in FIG. 7, the network device 700 has three slots identified as LC slot 1, 2, and 3 occupied by the three line cards 706, 708, and 710, respectively. Other embodiments may have fewer or more management cards and/or fewer or more line cards.

During normal operation of the network device 700, one of the two management cards 702 and 704 operates in an active role while the other management card operates in a passive or standby role. When operating in active mode, a management card is referred to as the active management card and is responsible for performing the control and forwarding functions for network device 700. The processing entity of the active management card operates as the active processing entity. When operating in standby mode, a management card is referred to as the standby management card and does not perform, or performs just a subset of, the control and forwarding functions performed by the active management card. The processing entity of the standby management card operates as the standby processing entity. In the embodiment depicted in FIG. 4, management card 702 is the active management card and management card 704 is the standby management card. A failover or switchover may, however, causes the management card 704 to become the active management card, and causes the management card 702 to become the standby management card.

In other embodiments, the management cards 702 and 704 each comprise two processing entities, wherein one processing entity at each of the management cards 702 and 704 operates in active mode, while the other processing entity at each of the management cards 702 and 704 operates in passive or standby mode. A failover or switchover occurring in one of the two management cards 702 or 704 would cause the standby processing entity of the affected management card to become the active processing entity, and cause the active processing entity of the affected management card to become the standby processing entity.

Each of the line cards 706, 708, and 710 of the network device 700 has two processing entities, although line cards may have fewer or more processing entities in other embodiments. When operating in active mode, a processing entity of a line card, referred to herein as an active processing entity, is responsible for providing packet forwarding services for network device 700. When operating in passive or standby mode, a processing entity of the line card, referred to herein as a passive or standby processing entity, does not perform, or performs just a subset of, the packet forwarding services performed by the active processing entity of the line card. During normal operation of the network device 700, each of the line cards 706, 708, and 710 has an active processing entity and a standby processing entity. In the embodiment depicted in FIG. 7, the line card 706 associated with the identifier LC slot 1 has the active processing entity 712 and the standby processing entity 714; the line card 708 associated with the identifier LC slot 2 has the active processing entity 716 and the standby processing entity 718; and the line card 710 associated with the identifier LC slot 3 has the active processing entity 720 and the standby processing entity 722. A failover or switchover may, however, cause the active processing entity of a line card to become the standby processing entity of the line card, and cause the standby processing entity of the line card to become the active processing entity of the line card.

In other embodiments, the line cards of network device 700 each comprise only one processing entity, wherein the one processing entity at each line card operates in either the active mode or the standby mode. The line card would operate as an active line card or a standby line card, respectively. For full redundancy, each line card would need a dedicated peer line card to handle failover or switchover. A failover or switchover occurring in an active line card would cause the peer line card to become the active line card, and cause the previously active line card to become the new standby line card. In some embodiments, both a line card and its peer line card may be associated with a common slot identifier, e.g., LC slot 1. This allows the HAML to multicast messages to both the line card and its peer line card using the common slot identifier.

During normal operations, the active processing entities of the network device 700 are configured or configurable to manage the hardware resources of network device 700 and perform a set of networking functions. During this time, the standby processing entities may be passive and may not perform the set of functions performed by the active processing entities. When a failover or switchover occurs at an active processing entity, the standby processing entity for that active processing entity becomes the active processing entity and takes over management of hardware resources and performance of the set of functions related to network device 700 that was previously performed by the processing entity that was previously active and, as a result, the set of functions continues to be performed. The previous active processing entity may then become the standby processing entity and be ready for a subsequent failover or switchover of the new active processing entity. For example, for the embodiment depicted in FIG. 7, for line card 706, a failover will cause the standby processing entity 714 to become the new active processing entity, and cause the active processing entity 712 to become the new standby processing entity. The set of functions that are performed by an active processing entity on a card may differ from one network device to another. The active-standby model coupled with techniques described in this application enable functions to be performed without any interruption or any disruption to the applications even during or after a failover or switchover. This translates to higher availability of network device 700.

A switchover may be caused by various different events, including anticipated or voluntary events. A voluntary or anticipated event is typically a voluntary user-initiated event that is intended to cause the active processing entity to voluntarily yield control to the standby processing entity. An instance of such an event is a command received from a network administrator to perform a switchover. There are various situations when a network administrator may cause a switchover to occur on purpose, such as when software on the management card and line card processing entities is to be upgraded to a newer version. As another example, a switchover may be voluntarily initiated by the system administrator upon noticing performance degradation on the active processing entity or upon noticing that software executed by the processor of the active processing entity is malfunctioning. In these cases, the network administrator may voluntarily issue a command that causes a switchover, with the expectation that problems associated with the current active processing entity will be remedied when the standby processing entity becomes the new active processing entity. A command to cause a switchover may also be initiated as part of scheduled maintenance. Various interfaces, including a command line interface (CLI), may be provided for initiating a voluntary switchover.

A failover may be caused by various different events, including unanticipated or involuntary events. For example, a failover may occur due to some critical failure in the active processing entity, such as a problem with the software executed by the processor of the active processing entity, failure in the operating system loaded by the active processing entity, hardware-related errors on the active processing entity or other router component, and the like.

In one embodiment, network device 700 is able to perform a failover or switchover without interrupting the networking services offered by network device 700. Network device 700 is able to continue providing networking services at line rates without impact (e.g., without experiencing any packet loss) as a result of, or while performing, a failover or switchover.

Figure 9:
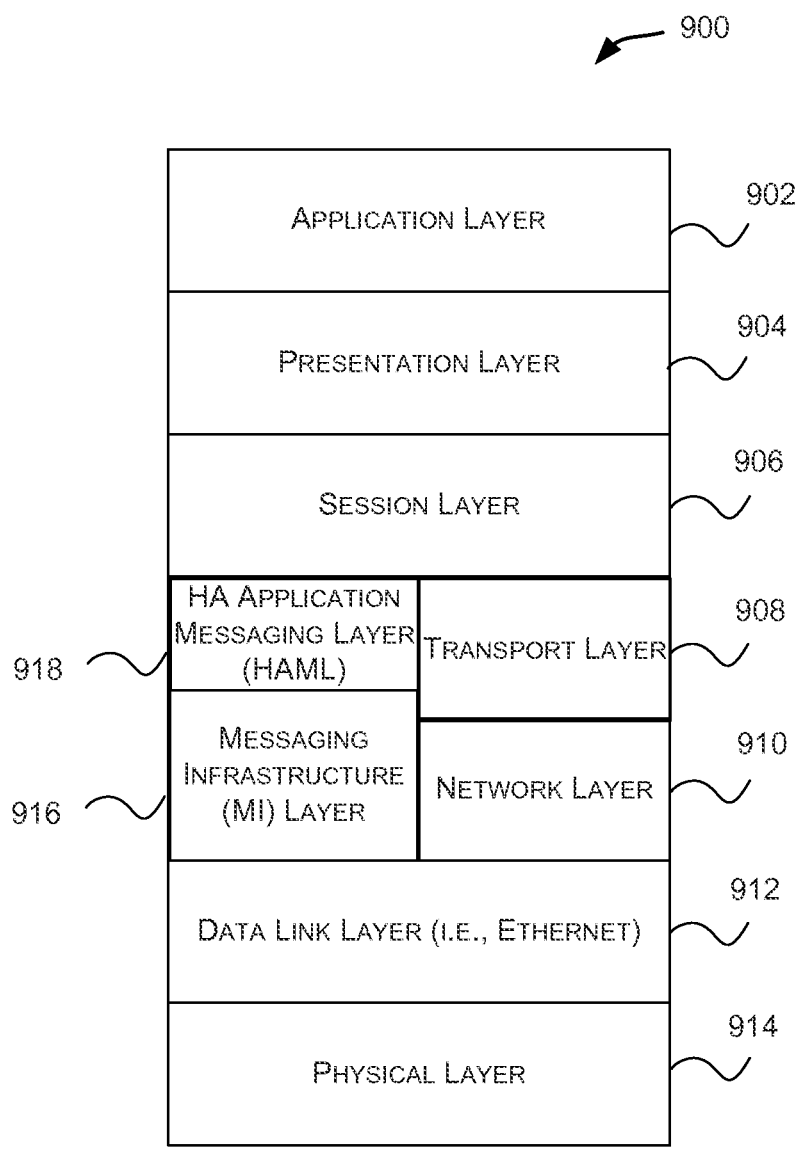
FIG. 9 depicts an exemplary OSI network stack for the networking protocols used in one embodiment of the present invention; and The foregoing, together with other features and embodiments will become more apparent upon referring to the following specification, claims, and accompanying drawings.

The network device 700 of FIG. 7 illustrates a distributed software model wherein each card on the network device 700 has one or more processing entities, each processing entity executing its own operating system, and networking and application stack to perform collective routing tasks for the network device. The processing entities may communicate with each other over the bus 724. In one embodiment, the processing entities communicate with each other using networking protocols. FIG. 9 depicts an exemplary OSI network stack 900 for the networking protocols used in embodiments of the invention. Each card shown in FIG. 7 depicts the application (726, 732, etc.), the transport layer (TL) (738, 740, etc.), the network layer (NL) (728, 734, etc.), and the data link layer (DLL) (730, 736, etc.) of the OSI network stack executing on each processing entity. However, the processing entities on the cards may execute any number of the protocol layers from the OSI network stack 900, as depicted in FIG. 9, for communicating with each other.

Certain embodiments of the invention may implement a novel transport layer protocol, referred to as the HAML 918 protocol in this disclosure, and depicted in FIG. 9, for optimized communication amongst the various processing entities within the network device 700. Some embodiments of the invention may also implement a combined transport layer and network layer protocol, referred to as the MI layer 916 protocol depicted in FIG. 9, and described in Chin. In one embodiment, the HAML 918 may use one or more of the MI layer 916 protocol and another network layer protocol, e.g., the Internet Protocol (IP), for communicating amongst processing entities.

FIG. 9 illustrates an OSI network stack 900 that may be used in one embodiment of the invention. A network device may have multiple processing entities within the device. In a distributed software model, each processing entity may execute one or more applications running on an operating system and network system. The network system may comprise a network stack, such as the OSI network stack 900, shown in FIG. 9. The OSI network stack 900 may comprise the physical layer 914; the data link layer 912; the networking layer 910, which may further include the MI layer 916; the transport layer 908, which may further include the HAML 918 and possibly the MI layer 916; the session layer 906; the presentation layer 904; and the application layer 902.

Out of these layers from the OSI network stack 900, the transport layer 908 provides the functional and procedural means of end-to-end communication services for applications. One well-known transport layer protocol from the OSI network stack 900 is the Transmission Control Protocol (TCP). TCP is a reliable connection-oriented transport service that provides end-to-end reliability, re-sequencing, and flow control.

Embodiments of the invention describe the HAML protocol, an alternate implementation of the transport layer protocol. As shown in FIG. 9, in one implementation, the HAML 918 may co-exist with other transport layer 908 protocols, such as TCP and/or the MI layer 916 protocol. For example, in some embodiments, the HAML 918 is an extension of the transport layer provided by the MI layer 916 protocol. Thus, the HAML 918 can connect to the MI layer 916 to provide an enhanced transport layer to the applications.

Various embodiments described above can be realized using any combination of dedicated components and/or programmable processors and/or other programmable devices. The various embodiments may be implemented only in hardware, or only in software, or using combinations thereof. For example, the software may be in the form of instructions, programs, etc. stored in a computer-readable memory and may be executed by a processing unit, where the processing unit is a processor, a collection of processors, a core of a processor, a set of cores, etc. In certain embodiments, the various processing described above, including the processing depicted in the flowcharts in FIGS. 2, 4, and 6 can be performed in software without needing changes to existing device hardware (e.g., router hardware), thereby increasing the economic viability of the solution. Since certain inventive embodiments can be implemented entirely in software, it allows for quick rollouts or turnarounds along with lesser capital investment, which further increases the economic viability and attractiveness of the solution.

The various processes described herein can be implemented on the same processor or different processors in any combination, with each processor having one or more cores. Accordingly, where components or modules are described as being adapted to, configured to, or configurable to perform a certain operation, such configuration can be accomplished, e.g., by designing electronic circuits to perform the operation, by programming programmable electronic circuits (such as microprocessors) to perform the operation, by providing software or code instructions that are executable by the component or module (e.g., one or more processors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

The various embodiments are not restricted to operation within certain specific data processing environments, but are free to operate within a plurality of data processing environments. Additionally, although embodiments have been described using a particular series of transactions, this is not intended to be limiting.

Thus, although specific invention embodiments have been described, these are not intended to be limiting. Various modifications and equivalents are within the scope of the following claims.

APPENDIX

APIs for a High Availability Application Messaging Layer (HAML)

haml_open( ) creates an HAML endpoint for communication and returns an HAML handle.

```
#include <haml/haml.h>
struct haml_op {
    const char * name;
    int instance;
    int (*cb)(int haml_handle, void *ctx);
    void * ctx;
    mq_t * mq;
}
int haml_open(struct haml_op *hop,
              int fss_handle)
```

The name and instance uniquely identify an HAML endpoint across the network device.
haml_open( ) will create an HAML handle and will bind the name and instance to it.
The fss_handle may be the value returned by fssd_register( ). It is expected the application will obtain an fss_handle prior to calling haml_open( ). The HAML uses the fss_handle when messages need to be sent over FSS during HAML sends. If FSS integration is not needed, fss_handle should be set to zero. All FSS operations can be done directly through FSS.
The cb callback would be invoked with the ctx context provided here, when there are HAML messages pending for the application.
The mq argument is a pointer to an ASP message queue that would be used for both HAML and FSS operations. If mq is NULL, the callback would be invoked in GIOT context.
On success, the HAML handle (haml_handle) is returned as a positive integer. On error, haml_open( ) returns a negative error code.

haml_sendmsg( ) is used to send HAML messages to destination endpoints and to the standby in a HA (High Availability) messaging safe manner.

```
#include <haml/haml.h>
int haml_sendmsg(int haml_handle,
                 const struct msghdr * msg_header,
                 int flags);
``` haml_handle returned by haml_open( ) needs to be passed in as the first argument.
The msg_header may be a pointer to a struct msghdr defined in a header file.
The flags argument is the bitwise OR of zero or more of the following flags:

| | |
|---|---|
| HAML_FSS | Use the FSS transport layer to send the message to the standby endpoint. |
| HAML_SYNC | Wait for an acknowledgment from all the destinations before returning. |
| HAML_NOWAIT_STANDBY | Return immediately after sending the message to all destinations without waiting for an acknowledgment. |

On success, haml_sendmsg( ) returns the number of bytes sent. On error, haml_sendmsg( ) returns a negative error code.

haml_recvmsg( ) is used to receive a message from the HAML.

```
#include <haml/haml.h>
int haml_recvmsg(int haml_handle,
                 const struct msghdr * msg_header,
                 int flags);
```

APPENDIX-continued

APIs for a High Availability Application Messaging Layer (HAML)

This function would need to be invoked as part of the callback provided to haml_open( ) to extract messages from HAML. haml_handle returned by haml_open( ) needs to be passed in as the first argument. The msg_header may be a pointer to a struct msghdr.
The flags argument is the bitwise OR of zero or more of the following flags:
HAML_PEEK  Return message from the beginning of the receive queue without removing it from the queue.
HAML_WAIT  Block until you receive a message.
HAML_NOWAIT Check for messages in a non-blocking manner. Return immediately if there are no pending messages.
On success, haml_recvmsg( ) returns the number of bytes received. On error, haml_recvmsg( ) returns a negative error code.
The cmsghdr in an ancillary data buffer associated with the msghdr would contain msg_id's for the received messages.
  haml_msgdone( ) is used by applications at the destination to notify the HAML that the processing of a message is complete.
  #include <haml/haml.h>
  int haml_msgdone(int haml_handle,
        int msg_id);
haml_handle returned by haml_open( ) needs to be passed in as the first argument.
The cmsghdr in an ancillary data buffer associated with the msghdr populated by haml_recvmsg( ) would contain msg_id for the corresponding messages.
On success, haml_msgdone( ) returns 0. On error, haml_msgdone( ) returns −1.
  haml_close( ) closes an HAML endpoint.
  #include <haml/haml.h>
  void haml_close(int haml_handle)
haml_close( ) does not return a value.

What is claimed is:

1. A network device comprising:
a plurality of processing entities each configured to execute one or more applications;
a first processing entity in the plurality of processing entities configured to operate in a first role and to transmit a message to an intended destination, the first processing entity being the source of the message;
a second processing entity in the plurality of processing entities configured to operate in a second role, to receive the message, and to store the message at the second processing entity, the second processing entity being a peer to the source of the message;
a third processing entity in the plurality of processing entities configured to operate in the first role and to receive the message, the third processing entity being the intended destination of the message;
a fourth processing entity in the plurality of processing entities configured to operate in the second role, to receive the message, and to store the message at the fourth processing entity, the fourth processing entity being a peer to the intended destination of the message;
the first processing entity is further configured to receive an acknowledgement indicating that the message was received at the third processing entity and at the fourth processing entity, and in response to receiving the acknowledgement, to transmit a notification to the second processing entity to remove the message stored at the second processing entity; and
the second processing entity is further configured to receive the notification, and in response to receiving the notification, to remove the message stored at the second processing entity.

2. The network device of claim 1, wherein
the first role is an active role, wherein a processing entity operating in the first role is further configured to perform a set of transport-related functions in the active role; and
the second role is a standby role, wherein a processing entity operating in the second role is further configured to not perform the set of transport-related functions in the standby role.

3. The network device of claim 1, wherein the fourth processing entity is further configured to switch to operation in the first role from the second role when the third processing entity is no longer operating in the first role, to read the message, and to process the message.

4. The network device of claim 1, wherein
the third processing entity is further configured to read the message, to process the message, and after processing the message, to transmit a notification to the fourth processing entity to remove the message stored at the fourth processing entity; and
the fourth processing entity is further configured to receive the notification, and in response to receiving the notification, to remove the message stored at the fourth processing entity.

5. The network device of claim 1, wherein the first processing entity is further configured to block control, to receive an acknowledgement indicating that the message was received at the second processing entity, and in response to receiving the acknowledgement, to unblock control.

6. The network device of claim 5, wherein the second processing entity is further configured to switch to operation in the first role from the second role when the first processing entity is no longer operating in the first role, and to transmit the message for the intended destination.

7. The network device of claim 1, wherein the first processing entity is further configured to receive an error notification indicating that the message was not received at the third processing entity.

8. The network device of claim 1, wherein
the message is for a plurality of intended destinations; and
the first processing entity is further configured to transmit the message to each intended destination of the plurality of intended destinations, and to transmit the message to each peer to each intended destination of the plurality of intended destinations.

9. The network device of claim 1, wherein the message is sent from the first processing entity to the second processing entity, the third processing entity and the fourth processing entity as a transport layer message of Open Systems Interconnection (OSI) model.

10. The network device of claim 1, wherein each of the first processing entity, the second processing entity, third processing entity is any of a physical processing unit, logical processing unit or virtual processing entity.

11. The network device of claim 1, wherein each of the second and fourth processing entity is configured to perform a same function as the respective peer processing entity.

12. A method comprising:
transmitting a message to an intended destination from a first processing entity configured to execute one or more applications and operating in a first role, the first processing entity being the source of the message;
receiving the message at a second processing entity configured to execute one or more applications and operating in a second role, the message stored at the second processing entity, the second processing entity being a peer to the source of the message;
receiving the message at a third processing entity configured to execute one or more applications and operating in the first role, the third processing entity being the intended destination of the message;
receiving the message at a fourth processing entity configured to execute one or more applications and operating in the second role, the message stored at the fourth processing entity, the fourth processing entity being a peer to the intended destination of the message;
receiving at the first processing entity an acknowledgement indicating that the message was received at the third processing entity and at the fourth processing entity;
in response to receiving the acknowledgement, transmitting a notification to the second processing entity to remove the message stored at the second processing entity;
receiving the notification at the second processing; and
in response to receiving the notification, removing the message stored at the second processing entity.

13. The method of claim 12, wherein
the first role is an active role, wherein a processing entity operating in the first role performs a set of transport-related functions in the active role; and
the second role is a standby role, wherein a processing entity operating in the second role does not perform the set of transport-related functions in the standby role.

14. The method of claim 13, further comprising:
switching, by the fourth processing entity, to operating in the first role from the second role when the third processing entity is no longer operating in the first role;
reading the message at the fourth processing entity; and
processing the message at the fourth processing entity.

15. The method of claim 12, further comprising:
reading the message at the third processing entity;
processing the message at the third processing entity; and
after processing the message at the third processing entity, transmitting a notification to the fourth processing entity to remove the message stored at the fourth processing entity;
receiving the notification at the fourth processing entity; and
in response to receiving the notification at the fourth processing entity, removing the message stored at the fourth processing entity.

16. The method of claim 12, further comprising:
blocking control at the first processing entity;
receiving at the first processing entity an acknowledgement indicating that the message was received at the second processing entity; and
in response to receiving the acknowledgement, unblocking control at the first processing entity.

17. The method of claim 16, further comprising:
switching, by the second processing entity, to operating in the first role from the second role when the first processing entity is no longer operating in the first role; and
transmitting the message for the intended destination from the second processing entity.

18. The method of claim 12, further comprising receiving at the first processing entity an error notification indicating that the message was not received at the third processing entity.

19. The method of claim 12, wherein the message is for a plurality of intended destinations, and the method further comprises:
transmitting the message to each intended destination of the plurality of intended destination; and
transmitting the message to each peer to each intended destination of the plurality of intended destinations.

20. The method of claim 12, wherein each of the second and fourth processing entity is configured to perform a same function as the respective peer processing entity.

* * * * *